US011474838B2

(12) United States Patent
Goenka et al.

(10) Patent No.: US 11,474,838 B2
(45) Date of Patent: Oct. 18, 2022

(54) MODIFYING CONTENT INTERFACE BASED UPON LEVEL OF ACTIVITY

(71) Applicant: VERIZON PATENT AND LICENSING INC., Basking Ridge, NY (US)

(72) Inventors: Mohit Goenka, Santa Clara, CA (US); Ashish Khushal Dharamshi, Sunnyvale, CA (US); Nikita Varma, Milpitas, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 91 days.

(21) Appl. No.: 16/175,996

(22) Filed: Oct. 31, 2018

(65) Prior Publication Data

US 2020/0133691 A1 Apr. 30, 2020

(51) Int. Cl.
*G06F 9/451* (2018.01)
*G06F 3/0482* (2013.01)
*G06F 40/232* (2020.01)

(52) U.S. Cl.
CPC ............ *G06F 9/451* (2018.02); *G06F 3/0482* (2013.01); *G06F 40/232* (2020.01)

(58) Field of Classification Search
CPC ....... G06F 16/908; G06F 3/0482; G06F 9/451
See application file for complete search history.

(56) References Cited

U.S. PATENT DOCUMENTS

| 10,467,029 | B1* | 11/2019 | Lin ........................ G06F 9/451 |
| 2012/0056878 | A1* | 3/2012 | Miyazawa .......... G06F 3/04815 345/419 |
| 2013/0083219 | A1* | 4/2013 | Heo ....................... H04N 5/262 348/231.6 |
| 2013/0218553 | A1* | 8/2013 | Fujii ....................... G10L 15/26 704/9 |
| 2013/0227482 | A1* | 8/2013 | Thorsander ......... G06F 3/04883 715/821 |
| 2013/0268889 | A1* | 10/2013 | Barak ..................... G06F 3/048 715/825 |
| 2015/0192424 | A1* | 7/2015 | Kuo ..................... G01C 21/367 701/454 |
| 2015/0206090 | A1* | 7/2015 | Pakhchanyan .......... G06F 3/023 705/7.42 |
| 2015/0281156 | A1* | 10/2015 | Beausoleil ............. H04L 51/34 709/206 |

(Continued)

*Primary Examiner* — Tan H Tran

(57) ABSTRACT

One or more computing devices, systems, and/or methods for modifying content interfaces based upon levels of activity are provided. For example, a content interface may be displayed using a device. First activity performed using the first content interface may be detected. An activity profile associated with the device may be generated based upon the first activity. The first activity profile may be indicative of a first level of activity associated with the device. Second activity performed using the first content interface may be detected. It may be determined that a difference between the first level of activity and the second level of activity is greater than a threshold difference. Responsive to determining that the difference is greater than the threshold difference, the content interface may be modified to a modified version of the content interface associated with an exhaustion management mode.

20 Claims, 12 Drawing Sheets

(56) References Cited

U.S. PATENT DOCUMENTS

| | | | |
|---|---|---|---|
| 2015/0331881 A1* | 11/2015 | Myles | H04L 51/22 |
| | | | 707/689 |
| 2016/0227105 A1* | 8/2016 | Kobayashi | G06F 3/04847 |
| 2016/0323398 A1* | 11/2016 | Guo | G06N 20/00 |
| 2016/0353995 A1* | 12/2016 | Oleson | A61B 5/1118 |
| 2017/0127055 A1* | 5/2017 | Khabiri | H04N 13/144 |
| 2018/0136834 A1* | 5/2018 | Tumwattana | G06F 3/0485 |
| 2019/0050406 A1* | 2/2019 | Nguyen | G06F 16/24535 |
| 2019/0302897 A1* | 10/2019 | Wespel | G06F 40/263 |
| 2020/0042620 A1* | 2/2020 | Aggarwal | G09B 29/007 |
| 2020/0117636 A1* | 4/2020 | Nag | G06F 16/1794 |

* cited by examiner

INTERFACE BACKEND

DETERMINE SET OF CHARACTERISTICS

TIME OF DAY: 9 PM TO 12 AM

BIOMETRIC DATA: USER RAN 7.6 MILES PRIOR TO ACTIVITY SESSION

LOCATION: HOME

SELECT LEVEL OF ACTIVITY FROM ACTIVITY PROFILE BASED UPON SET OF CHARACTERISTICS:

LEVEL OF ACTIVITY 4

COMPARE LEVEL OF ACTIVITY OF ACTIVITY SESSION WITH LEVEL OF ACTIVITY 4

MODIFY CONTENT INTERFACE TO EXHAUSTION MANAGEMENT MODE RESPONSIVE TO DETERMINING THAT LEVEL OF ACTIVITY EXCEEDS LEVEL OF ACTIVITY 4

FIG. 5B

MODIFYING CONTENT INTERFACE BASED UPON LEVEL OF ACTIVITY

BACKGROUND

Many applications, such as email applications, instant messaging applications, social network applications, news content applications, browser applications, video applications, music-streaming applications, etc. may allow a user to create an account for consuming and/or creating content (e.g., emails, messages, news content, videos, music, etc.) using a content interface. For example, the user may interact with the content interface to compose emails, edit text, delete items, manage the account, etc. However, the user may become exhausted after interacting with the content interface for a duration of time, which may result in mistakes being made.

SUMMARY

In accordance with the present disclosure, one or more computing devices and/or methods are provided. In an example, a graphical user interface, of a device associated with a user account, may be controlled to display a content interface. First activity performed using the content interface may be detected. A first activity profile associated with the user account may be generated based upon the first activity. The first activity profile may be indicative of a first level of activity associated with the user account. Second activity performed using the content interface may be detected. The second activity may be analyzed to determine a second level of activity associated with the second activity. The first level of activity may be compared with the second level of activity to determine a difference between the first level of activity and the second level of activity. It may be determined that the difference between the first level of activity and the second level of activity is greater than a threshold difference. Responsive to determining that the difference between the first level of activity and the second level of activity is greater than the threshold difference, the content interface may be modified to a modified version of the content interface associated with an exhaustion management mode.

DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

FIG. 5B is a component block diagram illustrating an example system for modifying content interfaces based upon levels of activity, where a backend system of a first content interface selects a second level of activity for comparison with a first level of activity.

DETAILED DESCRIPTION

Subject matter will now be described more fully hereinafter with reference to the accompanying drawings, which form a part hereof, and which show, by way of illustration, specific example embodiments. This description is not intended as an extensive or detailed discussion of known concepts. Details that are known generally to those of ordinary skill in the relevant art may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof.

1. Computing Scenario

The following provides a discussion of some types of computing scenarios in which the disclosed subject matter may be utilized and/or implemented.

1.1. Networking

Figure 1:
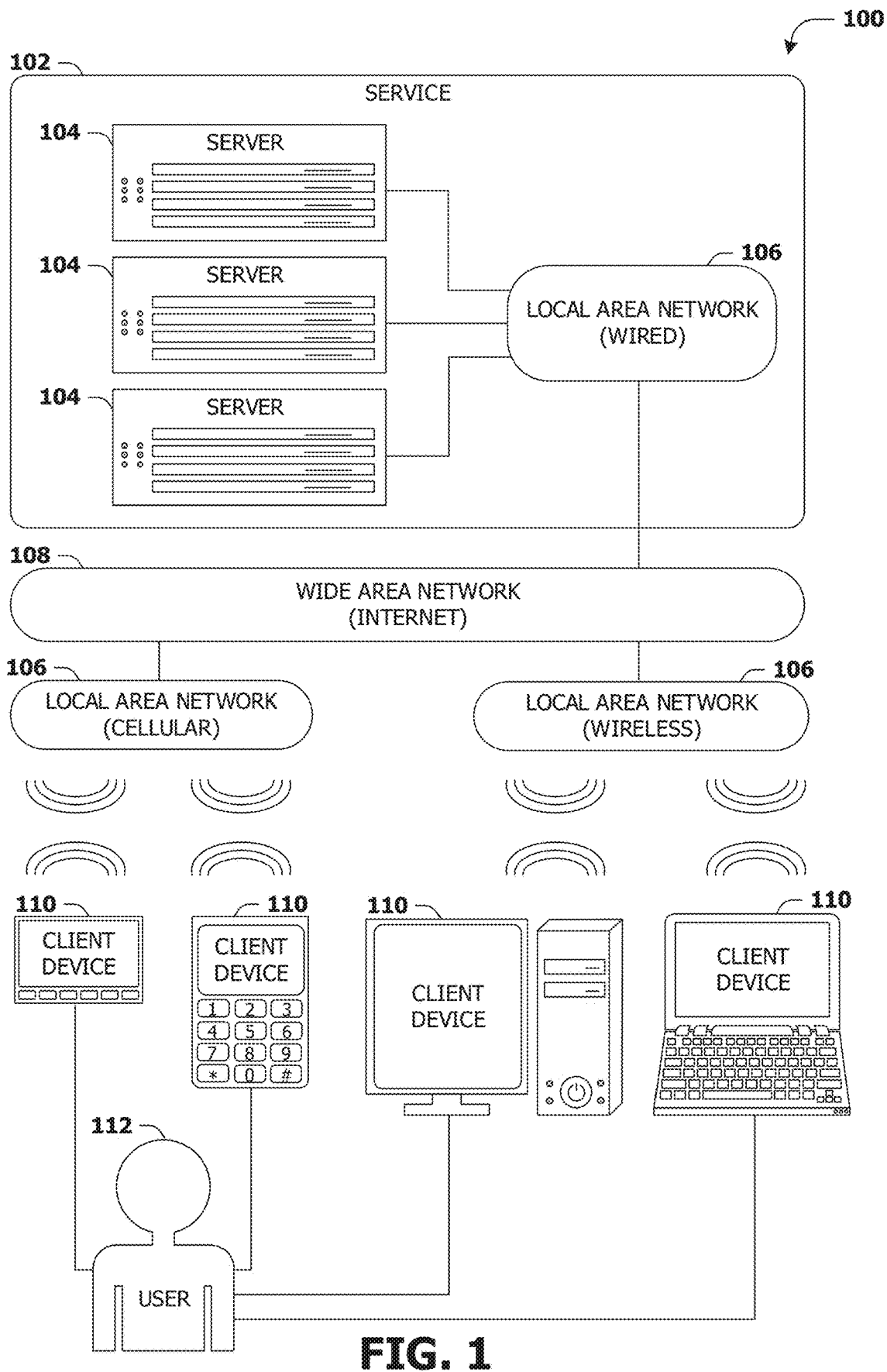
FIG. 1 is an illustration of a scenario involving various examples of networks that may connect servers and clients.

FIG. 1 is an interaction diagram of a scenario 100 illustrating a service 102 provided by a set of servers 104 to a set of client devices 110 via various types of networks. The servers 104 and/or client devices 110 may be capable of transmitting, receiving, processing, and/or storing many types of signals, such as in memory as physical memory states.

The servers 104 of the service 102 may be internally connected via a local area network 106 (LAN), such as a wired network where network adapters on the respective servers 104 are interconnected via cables (e.g., coaxial and/or fiber optic cabling), and may be connected in various topologies (e.g., buses, token rings, meshes, and/or trees). The servers 104 may be interconnected directly, or through one or more other networking devices, such as routers, switches, and/or repeaters. The servers 104 may utilize a variety of physical networking protocols (e.g., Ethernet and/or Fiber Channel) and/or logical networking protocols (e.g., variants of an Internet Protocol (IP), a Transmission Control Protocol (TCP), and/or a User Datagram Protocol (UDP). The local area network 106 may include, e.g., analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. The local area network 106 may be organized according to one or more network architectures, such as server/client, peer-to-peer, and/or mesh architectures, and/or a variety of roles, such as administrative servers, authentication servers, security monitor servers, data stores for objects such as files and databases, business logic servers, time synchronization servers, and/or front-end servers providing a user-facing interface for the service 102.

Likewise, the local area network 106 may comprise one or more sub-networks, such as may employ differing architectures, may be compliant or compatible with differing protocols and/or may interoperate within the local area network 106. Additionally, a variety of local area networks 106 may be interconnected; e.g., a router may provide a link between otherwise separate and independent local area networks 106.

In the scenario 100 of FIG. 1, the local area network 106 of the service 102 is connected to a wide area network 108 (WAN) that allows the service 102 to exchange data with other services 102 and/or client devices 110. The wide area network 108 may encompass various combinations of devices with varying levels of distribution and exposure, such as a public wide-area network (e.g., the Internet) and/or a private network (e.g., a virtual private network (VPN) of a distributed enterprise).

In the scenario 100 of FIG. 1, the service 102 may be accessed via the wide area network 108 by a user 112 of one or more client devices 110, such as a portable media player (e.g., an electronic text reader, an audio device, or a portable gaming, exercise, or navigation device); a portable communication device (e.g., a camera, a phone, a wearable or a text chatting device); a workstation; and/or a laptop form factor computer. The respective client devices 110 may communicate with the service 102 via various connections to the wide area network 108. As a first such example, one or more client devices 110 may comprise a cellular communicator and may communicate with the service 102 by connecting to the wide area network 108 via a wireless local area network 106 provided by a cellular provider. As a second such example, one or more client devices 110 may communicate with the service 102 by connecting to the wide area network 108 via a wireless local area network 106 provided by a location such as the user's home or workplace (e.g., a WiFi (Institute of Electrical and Electronics Engineers (IEEE) Standard 802.11) network or a Bluetooth (IEEE Standard 802.15.1) personal area network). In this manner, the servers 104 and the client devices 110 may communicate over various types of networks. Other types of networks that may be accessed by the servers 104 and/or client devices 110 include mass storage, such as network attached storage (NAS), a storage area network (SAN), or other forms of computer or machine readable media.

1.2. Server Configuration

Figure 2:
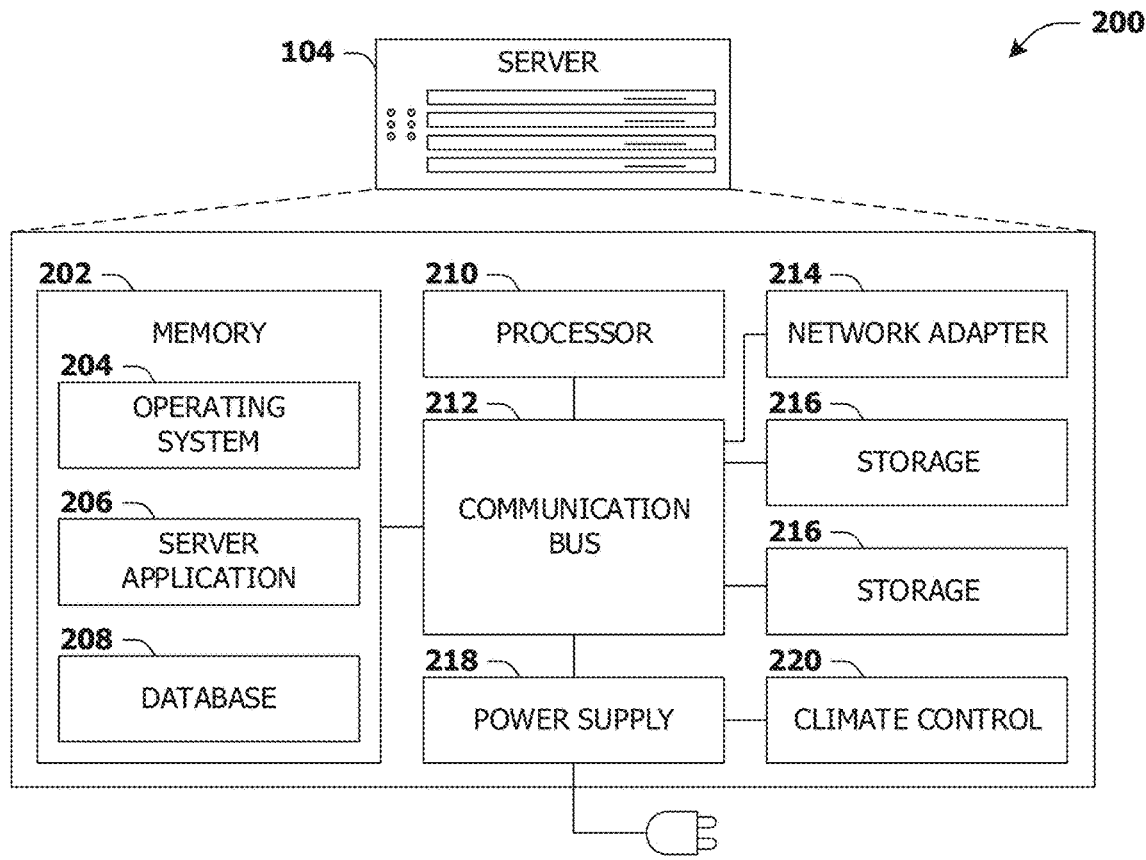
FIG. 2 is an illustration of a scenario involving an example configuration of a server that may utilize and/or implement at least a portion of the techniques presented herein.

FIG. 2 presents a schematic architecture diagram 200 of a server 104 that may utilize at least a portion of the techniques provided herein. Such a server 104 may vary widely in configuration or capabilities, alone or in conjunction with other servers, in order to provide a service such as the service 102.

The server 104 may comprise one or more processors 210 that process instructions. The one or more processors 210 may optionally include a plurality of cores; one or more coprocessors, such as a mathematics coprocessor or an integrated graphical processing unit (GPU); and/or one or more layers of local cache memory. The server 104 may comprise memory 202 storing various forms of applications, such as an operating system 204; one or more server applications 206, such as a hypertext transport protocol (HTTP) server, a file transfer protocol (FTP) server, or a simple mail transport protocol (SMTP) server; and/or various forms of data, such as a database 208 or a file system. The server 104 may comprise a variety of peripheral components, such as a wired and/or wireless network adapter 214 connectible to a local area network and/or wide area network; one or more storage components 216, such as a hard disk drive, a solid-state storage device (SSD), a flash memory device, and/or a magnetic and/or optical disk reader.

The server 104 may comprise a mainboard featuring one or more communication buses 212 that interconnect the processor 210, the memory 202, and various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 212 may interconnect the server 104 with at least one other server. Other components that may optionally be included with the server 104 (though not shown in the schematic diagram 200 of FIG. 2) include a display; a display adapter, such as a graphical processing unit (GPU); input peripherals, such as a keyboard and/or mouse; and a flash memory device that may store a basic input/output system (BIOS) routine that facilitates booting the server 104 to a state of readiness.

The server 104 may operate in various physical enclosures, such as a desktop or tower, and/or may be integrated with a display as an "all-in-one" device. The server 104 may be mounted horizontally and/or in a cabinet or rack, and/or may simply comprise an interconnected set of components. The server 104 may comprise a dedicated and/or shared power supply 218 that supplies and/or regulates power for the other components. The server 104 may provide power to and/or receive power from another server and/or other devices. The server 104 may comprise a shared and/or dedicated climate control unit 220 that regulates climate properties, such as temperature, humidity, and/or airflow. Many such servers 104 may be configured and/or adapted to utilize at least a portion of the techniques presented herein.

1.3. Client Device Configuration

Figure 3:
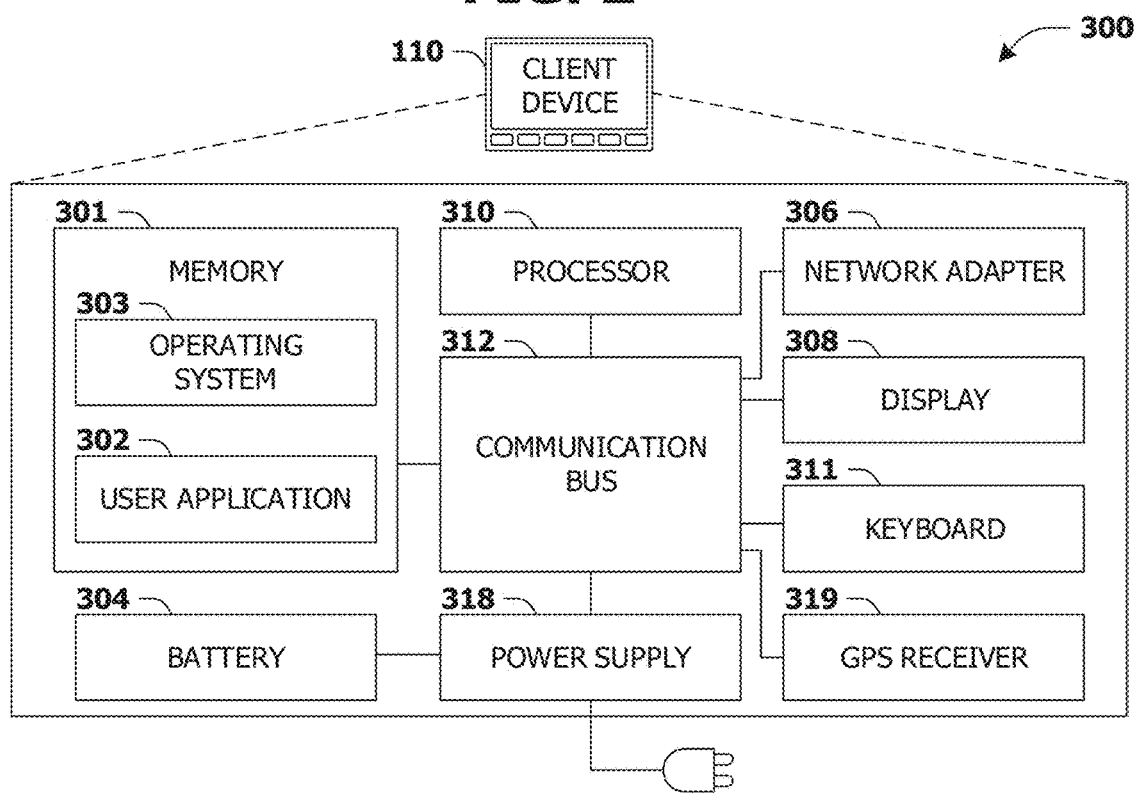
FIG. 3 is an illustration of a scenario involving an example configuration of a client that may utilize and/or implement at least a portion of the techniques presented herein.

FIG. 3 presents a schematic architecture diagram 300 of a client device 110 whereupon at least a portion of the techniques presented herein may be implemented. Such a client device 110 may vary widely in configuration or capabilities, in order to provide a variety of functionality to a user such as the user 112. The client device 110 may be provided in a variety of form factors, such as a desktop or tower workstation; an "all-in-one" device integrated with a display 308; a laptop, tablet, convertible tablet, or palmtop device; a wearable device mountable in a headset, eyeglass, earpiece, and/or wristwatch, and/or integrated with an article of clothing; and/or a component of a piece of furniture, such as a tabletop, and/or of another device, such as a vehicle or residence. The client device 110 may serve the user in a variety of roles, such as a workstation, kiosk, media player, gaming device, and/or appliance.

The client device 110 may comprise one or more processors 310 that process instructions. The one or more processors 310 may optionally include a plurality of cores; one or more coprocessors, such as a mathematics coprocessor or an integrated graphical processing unit (GPU); and/or one or more layers of local cache memory. The client device 110 may comprise memory 301 storing various forms of applications, such as an operating system 303; one or more user applications 302, such as document applications, media applications, file and/or data access applications, communication applications such as web browsers and/or email clients, utilities, and/or games; and/or drivers for various peripherals. The client device 110 may comprise a variety of peripheral components, such as a wired and/or wireless network adapter 306 connectible to a local area network and/or wide area network; one or more output components, such as a display 308 coupled with a display adapter (optionally including a graphical processing unit (GPU)), a sound adapter coupled with a speaker, and/or a printer; input devices for receiving input from the user, such as a keyboard 311, a mouse, a microphone, a camera, and/or a touch-sensitive component of the display 308; and/or environmental sensors, such as a global positioning system (GPS) receiver 319 that detects the location, velocity, and/or acceleration of the client device 110, a compass, accelerometer, and/or gyroscope that detects a physical orientation of the client device 110. Other components that may optionally be included with the client device 110 (though not shown in the schematic architecture diagram 300 of FIG. 3) include one or more storage components, such as a hard disk drive, a solid-state storage device (SSD), a flash memory device, and/or a magnetic and/or optical disk reader; and/or a flash memory device that may store a basic input/output system (BIOS) routine that facilitates booting the client device 110 to a state of readiness; and a climate control unit that regulates climate properties, such as temperature, humidity, and airflow.

The client device 110 may comprise a mainboard featuring one or more communication buses 312 that interconnect the processor 310, the memory 301, and various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The client device 110 may comprise a dedicated and/or shared power supply 318 that supplies and/or regulates power for other components, and/or a battery 304 that stores power for use while the client device 110 is not connected to a power source via the power supply 318. The client device 110 may provide power to and/or receive power from other client devices.

In some scenarios, as a user 112 interacts with a software application on a client device 110 (e.g., an instant messenger and/or electronic mail application), descriptive content in the form of signals or stored physical states within memory (e.g., an email address, instant messenger identifier, phone number, postal address, message content, date, and/or time) may be identified. Descriptive content may be stored, typically along with contextual content. For example, the source of a phone number (e.g., a communication received from another user via an instant messenger application) may be stored as contextual content associated with the phone number. Contextual content, therefore, may identify circumstances surrounding receipt of a phone number (e.g., the date or time that the phone number was received), and may be associated with descriptive content. Contextual content, may, for example, be used to subsequently search for associated descriptive content. For example, a search for phone numbers received from specific individuals, received via an instant messenger application or at a given date or time, may be initiated. The client device 110 may include one or more servers that may locally serve the client device 110 and/or other client devices of the user 112 and/or other individuals. For example, a locally installed webserver may provide web content in response to locally submitted web requests. Many such client devices 110 may be configured and/or adapted to utilize at least a portion of the techniques presented herein.

2. Presented Techniques

One or more computing devices and/or techniques for modifying content interfaces based upon levels of activity are provided. For example, a user may access and/or interact with a content interface (e.g., an email interface, a messaging interface, a news content interface, a browser, a video platform, a music-streaming platform, etc.) for consuming, creating and/or transmitting content (e.g., emails, messages, news content, videos, music, etc.). The content interface may be accessed and/or interacted with via a plurality of devices associated with a user account of the user. In some examples, the content interface may be accessed and/or interacted with using a first device of the plurality of devices. For example, emails may be composed, text may be edited, items may be deleted, the user account may be managed, etc. using the content interface. However, the user may become exhausted after interacting with the content interface for a duration of time, which may result in mistakes being made by the user (e.g., emails may be transmitted to incorrect contacts, words may be spelled incorrectly, important emails may be mistakenly deleted, settings of the user account may be incorrectly modified, etc.).

Thus, in accordance with one or more of the techniques presented herein, first activity performed using the content interface associated with the user account may be analyzed and/or a first activity profile may be generated based upon the first activity (e.g., the first activity profile may be generated and/or modified analyzing activity, including the first activity, performed across extended durations of times, such as days, weeks, months, etc.). For example, the first activity profile may be indicative of levels of activity associated with various times of day, various locations, etc. (e.g., a first level of activity may be indicative of an amount of activity that is normally performed during the day, a second level of activity may be indicative of an amount of activity that is normally performed at night, etc.). Second activity may be detected and/or a third level of activity may be determined based upon the second activity. For example, the second activity may be monitored and/or the third level of activity may be updated periodically. Once it is determined that the third level of activity exceeds a fourth level of activity (of the first activity profile) associated with a time, a location, etc. associated with the second activity, the content interface may be modified to a modified version of the content interface associated with an exhaustion management mode (e.g., the third level of activity exceeding the fourth level of activity may indicate that the user may be in an exhausted state). For example, one or more first functions associated with the content interface may be enabled and/or one or more second functions associated with the content interface may be disabled to prevent mistakes due to the user being in the exhausted state.

Figure 4:
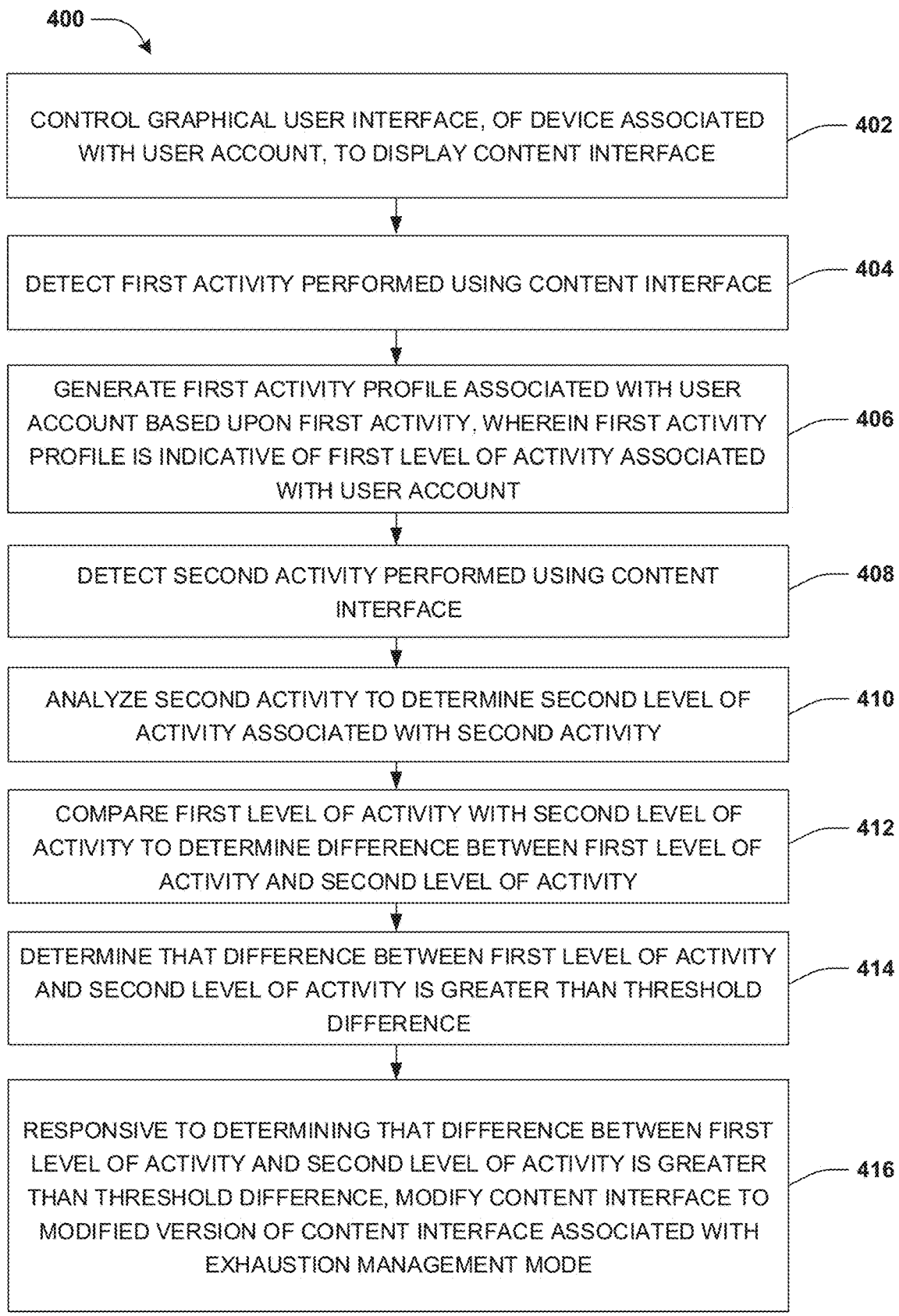
FIG. 4 is a flow chart illustrating an example method for modifying content interfaces based upon levels of activity.

An embodiment of modifying content interfaces based upon levels of activity is illustrated by an example method 400 of FIG. 4. A user, such as user Jill, (e.g., and/or a first client device associated with the user) may access and/or interact with a first content interface (e.g., an email interface, a messaging interface, a news content interface, a browser, a video platform, a music-streaming platform, etc.) for consuming, creating and/or transmitting content (e.g., emails, messages, news content, videos, music, etc.), communicating with other users, etc. In some examples, the first content interface may be accessed and/or interacted with via a plurality of client devices, comprising the first client device, associated with the user and/or a user account of the user. The first client device may be a computer, a laptop, a tablet, a smartphone, a wearable computer, etc. A first request to access the first content interface may be received from the first client device.

At 402, a graphical user interface of the first client device may be controlled to display the first content interface. For example, the first content interface may comprise a plurality of content items of a content items database associated with the first content interface and/or the user account. In some examples, the content items database may comprise a second plurality of content items. For example, the second plurality of content items may comprise email items, message items, news items, video items, audio items, etc. Alternatively and/or additionally, the first content interface may comprise a plurality of selectable inputs associated with transmitting items, deleting items, managing the user account, consuming items, etc. Alternatively and/or additionally, the first content interface may comprise one or more text areas associated with composing messages and/or emails, editing and/or creating reports and/or social media posts, etc.

At 404, first activity performed using the first content interface may be detected. For example, the first activity may comprise selectable inputs of the first content interface being selected (e.g., clicked, pressed, etc.) using a touchscreen (e.g., of the first client device), one or more switches (e.g., one or more buttons), a conversational interface (e.g., a voice recognition and natural language interface), etc. For example, the selectable inputs may correspond to one or more content items of the plurality of content items, one or more settings associated with the user account, etc. Alternatively and/or additionally, the first activity may comprise text being inputted into one or more text areas of the first content interface. Alternatively and/or additionally, the first activity may comprise one or more content items being consumed.

In an example, the first content interface may be an email interface and/or the plurality of content items may comprise a plurality of emails. Accordingly, the first activity may comprise one or more emails being selected, one or more emails being replied to, one or more emails being forwarded, one or more links within one or more emails being selected, one or more emails being composed, one or more emails being consumed, etc.

In some examples, the first activity may include activity performed using the first content interface during a first duration of time (e.g., 30 minutes, 1 hour, 1.5 hours, 3 hours, etc.). For example, the first activity may be monitored and/or analyzed (periodically) throughout the first duration of time.

In some example, the first activity may include activity performed continuously. For example, (intermittent) periods of inactivity within the first duration of time may (each) be less than a first threshold duration of time (e.g., 5 minutes, 10 minutes, 20 minutes, etc.).

Alternatively and/or additionally, the first activity may include activity performed using one or more content interfaces different than the first content interface. For example, the one or more content interfaces and/or the first content interface may be associated with a (single) system. Each content interface may be associated with a service, of a plurality of services, provided by the system. For example, the system may be an internet system providing a plurality of content interfaces, where each content interface of the plurality of content interfaces may provide a service of the plurality of services (e.g., a search engine service, a news content service, a video platform service, an email interface, etc.).

Alternatively and/or additionally, the first activity may include activity performed using one or more client devices, different than the first client device, of the plurality of client devices associated with the user account. For example, each client device the one or more client devices may have the first content interface installed (e.g., a version of the first content interface associated with a client device of the one or more client devices may be installed on the client device). Alternatively and/or additionally, the first content interface may be a web interface accessed via a browser of the client device and/or the one or more client devices.

In some examples, the text being inputted into the one or more text areas of the first content interface may be monitored and/or analyzed. For example, an amount of the text may be determined. For example, the amount of the text may be indicative of a quantity of words of the text inputted into the one or more text areas, a quantity of characters (e.g., letters, symbols, spaces, etc.) of the text inputted into the one or more text areas, etc. Alternatively and/or additionally, a text-rate at which the text is inputted into the one or more text areas may be determined. For example, the text-rate may be indicative of a quantity of words inputted per unit of time (e.g., per minute, per hour, etc.), a quantity of words that are inputted continuously, a quantity of characters inputted per unit of time (e.g., per minute, per hour, etc.), etc.

Alternatively and/or additionally, an instrument used for inputting the text into the one or more text areas may be determined. For example, the instrument may be indicative of whether the text is inputted into the one or more text areas via typing using a keyboard associated with the first client device, whether the text is inputted into the one or more text areas via typing using an on-screen keyboard displayed using the touchscreen of the first client device, whether the text is inputted via the conversational interface of the first client device, etc.

Alternatively and/or additionally, a distance between key strokes associated with the text being inputted into the one or more text areas may be determined. For example, the distance between key strokes may be determined based upon the instrument used for inputting the text into the one or more text areas (e.g., whether the text is inputted via the keyboard and/or the on-screen keyboard). Alternatively and/or additionally, the distance between key strokes may be determined based upon a type of the keyboard (e.g., size of the keyboard, keyboard model of the keyboard, etc.) and/or a type of the on-screen keyboard (e.g., size of the on-screen keyboard, device model of the first client device, orientation (e.g., portrait, horizontal, etc.) associated with a display of the first client device, etc.). For example, characters of the text may be mapped to keys associated with the keyboard and/or the on-screen keyboard. Distances between sets of keys of the keys may be measured to determine the distance between key strokes. The distance between key strokes may be a cumulative distance (e.g., a total distance of a plurality of distances between key strokes associated with characters of the text) and/or the distance between key strokes may be an average distance (e.g., an average distance of the plurality of distances).

Alternatively and/or additionally, a key stroke effort associated with the text being inputted into the one or more text areas may be determined. For example, the key stroke effort may correspond to an amount of pressure needed to implement a key stroke (press a key). For example, the key stroke effort may be determined based upon the instrument used for inputting the text into the one or more text areas (e.g., whether the text is inputted via the keyboard and/or the on-screen keyboard). Alternatively and/or additionally, the key stroke effort may be determined based upon the type of the keyboard (e.g., the keyboard model), settings associated with the keyboard, the type of the on-screen keyboard and/or settings associated with the on-screen keyboard.

Alternatively and/or additionally, a writing effort associated with the text being inputted into the one or more text areas may be determined. For example, the writing effort may correspond to an amount of effort (e.g., mental effort, cognitive load, etc.) it may take for the user to develop and/or create the text. For example, the writing effort may be determined by analyzing content (e.g., words, sentences, subject matter, etc.) of the text and/or determining a level of complexity of the content (based upon the words, sentence structure, subject matter, etc. of the text). For example, in an instance where the text comprises complex descriptions of ideas and/or entities, the level of complexity and/or the writing effort may be determined to be higher than an instance where the text merely comprises simple descriptions (e.g., an address of a location, a phone number, etc.).

In some examples, a measure of writing activity may be generated based upon the text inputted into the one or more areas of the first content interface. For example, the measure of writing activity may be generated based upon the amount of the text, the text-rate at which the text is inputted into the one or more text areas, the instrument used for inputting the text into the one or more text areas, the distance between key strokes, the key stroke effort and/or the writing effort. For example, the measure of writing activity may be generated by combining two or more of the amount of the text, the text-rate at which the text is inputted into the one or more text areas, the instrument used for inputting the text into the one or more text areas, the distance between key strokes, the key stroke effort and/or the writing effort.

In some examples, first selections of selectable inputs of the first content interface may be monitored and/or analyzed. For example, an amount of the first selections of the selectable inputs may be determined. For example, the amount of the first selections may be indicative of a quantity of selections of selectable inputs of the first content interface. Alternatively and/or additionally, a selection-rate at which selections of the first selections are performed may be determined. For example, the selection-rate may be indicative of a quantity of selections performed per unit of time (e.g., per minute, per hour, etc.), etc.

Alternatively and/or additionally, a second instrument used for performing the first selections may be determined. For example, the second instrument may be indicative of whether the first selections are performed using the touchscreen of the first client device, the conversational interface of the first client device, the keyboard associated with the first client device, a mouse associated with the first client device, a remote control (e.g., a wireless remote control) associated with the first client device, etc.

Alternatively and/or additionally, a number of steps associated with selections of the first selections may be determined. For example, it may be necessary to select more than one selectable input in order to perform a first selection of a first selectable input (e.g., the first selection of the first selectable input may involve two or more steps). In the example where the first content interface is an email interface, the first selectable input may correspond to forwarding an email. In some examples, before selecting the first selectable input (and/or forwarding the email), a second selectable input corresponding to the email must be selected (to open the email). For example, responsive to a selection of the second selectable input, a page comprising the email and/or the first selectable input may be displayed. The first selectable input may be selected via the page.

Alternatively and/or additionally, a selection effort associated with the first selections may be determined. The selection effort may correspond to an amount of effort (e.g., mental effort, cognitive load, etc.) it may take for the user to perform selections of the first selections. For example, an amount of effort associated with first types of selections (e.g., selections associated with displaying content items, selections associated with logging into the user account, etc.) may be less than an amount of effort associated with second types of selections (e.g., selections associated with completing a transfer of funds, selections associated with organizing content items, selections associated with requesting transmission of emails and/or messages to important contacts, such as clients, etc.).

In some examples, a measure of selecting activity may be generated based upon the first selections of selectable inputs of the first content interface. For example, the measure of selecting activity may be generated based upon the amount of the first selections, the selection-rate at which selections of the first selections are performed, the second instrument used for performing the first selections, the number of steps associated with selections of the first selections and/or the selection effort associated with the first selections. For example, the measure of selecting activity may be generated by combining two or more of the amount of the first selections, the selection-rate at which selections of the first selections are performed, the second instrument used for performing the first selections, the number of steps associated with selections of the first selections and/or the selection effort associated with the first selections.

Alternatively and/or additionally, consuming activity associated with a set of content items of the plurality of content items being consumed may be monitored and/or analyzed. In some examples, it may be determined that a content item of the plurality of content items is being consumed based upon interactions with the content item (e.g., selecting sets of text of the content item, scrolling through portions of the content item, pressing pause and/or play, etc.), a duration of time that the content item is displayed, etc. For example, an amount of content associated with the set of content items may be determined. For example, the amount of content may be indicative of a quantity of words of the set of content items, a quantity of characters of the set of content items, a time-length of one or more videos of the set of content items consumed, etc. Alternatively and/or additionally, the amount of content may be indicative of a second duration of time that the set of content items are consumed (e.g., the second duration of time that the user spends consuming the set of content items).

Alternatively and/or additionally, a consume-rate at which content items of the set of content items are consumed may be determined. For example, the consume-rate may be indicative of a quantity of words consumed per unit of time (e.g., per minute, per hour, etc.), a quantity of images consumed per unit of time (e.g., per minute, per hour, etc.), a quantity of content items consumed per unit of time (e.g., per minute, per hour, etc.), etc.

Alternatively and/or additionally, a third instrument used for consuming the set of content items may be determined. For example, the third instrument may be indicative of a size of the display of the first client device (e.g., consuming the set of content items using a smaller display may be more difficult than consuming the set of content items using a larger display). Alternatively and/or additionally, a consuming effort associated with the set of content items being consumed may be determined. For example, the consuming effort may correspond to an amount of effort (e.g., mental effort, cognitive load, etc.) it may take for the user to consume (e.g., read, view, listen to, comprehend, learn, etc.) the set of content items. For example, the consuming effort may be determined by analyzing content (e.g., words, sentences, subject matter, etc.) of the set of content items and/or determining a second level of complexity of the set of content items.

In some examples, a measure of consuming activity may be generated based upon the consuming activity associated with the set of content items being consumed. For example, the measure of consuming activity may be generated based upon the amount of content associated with the set of content items, the consume-rate at which content items of the set of content items are consumed, the third instrument used for consuming the set of content items and/or the consuming effort associated with set of content items being consumed. For example, the measure of consuming activity may be generated by combining two or more of the amount of content associated with the set of content items, the consume-rate at which content items of the set of content items are consumed, the third instrument used for consuming the set of content items and/or the consuming effort associated with set of content items being consumed.

In some examples, a plurality of requests received from the first client device may be monitored and/or analyzed. In some examples, a first quantity of requests of the plurality of requests associated with the first activity may be determined. For example, the plurality of requests may be received from the first client device while the first activity is being performed. For example, the plurality of requests may comprise authentication requests, requests for content, application programming interface (API) requests (e.g., API calls), requests to access resources, requests for transmission of messages and/or emails, etc.

Alternatively and/or additionally, a request-rate at which requests of the plurality of requests are received from the first client device may be determined. For example, the request-rate may be indicative of a quantity of requests received from the first client device per unit of time (e.g., per minute, per hour, etc.), etc. In some examples, a measure of requesting activity may be generated based upon the plurality of requests received from the first client device. For example, the measure of requesting activity may be generated based upon the quantity of requests of the plurality of requests and/or the request-rate at which requests of the plurality of requests are received. Alternatively and/or additionally, the measure of requesting activity may be generated by combining the quantity of requests of the plurality of requests and the request-rate at which requests of the plurality of requests are received.

In some examples, the plurality of requests may be used to determine content items that are consumed, emails and/or messages that are transmitted, the text that is inputted into the one or more text areas, etc. In some examples, a plurality of transmissions of items associated with the first activity may be monitored and/or analyzed. For example, a quantity of transmissions of items (e.g., items may be emails, messages, instant messages, blog posts, social media posts, files etc.) of the plurality of transmissions of items (e.g., items may be transmitted to contacts, posted on blogs, posted on social media, etc.) may be determined. Alternatively and/or additionally, a transmission-rate at which items are transmitted may be determined. The transmission-rate may be indicative of a quantity of items transmitted per unit of time (e.g., per minute, per hour, etc.) (e.g., a quantity of transmissions per unit of time), etc.

In some examples, a measure of transmission activity may be generated based upon the quantity of transmissions of items of the plurality of transmissions of items and/or the transmission-rate at which items are transmitted. Alternatively and/or additionally, the measure of transmission activity may be generated by combining the quantity of transmissions of items of the plurality of transmissions of items and the transmission-rate at which items are transmitted.

At 406, a first activity profile, associated with the user account, may be generated based upon the first activity. For example, the first activity profile may be indicative of a first level of activity associated with the user account and/or the first client device. In some examples, the first level of activity may be generated based upon the measure of writing activity, the measure of selecting activity, the measure of consuming activity, the measure of requesting activity and/or the measure of transmission activity. Alternatively and/or additionally, the first level of activity may be generated by combining two or more of the measure of writing activity, the measure of selecting activity, the measure of consuming activity, the measure of requesting activity and/or the measure of transmission activity. Alternatively and/or additionally, rather than generating the first activity profile, the first activity profile and/or the first level of activity may be modified based upon the first activity (if the first activity profile and/or the first level of activity existed prior to the first activity being performed).

For example, a first set of representations (e.g., a set of one or more representations, such as a set of one or more vector representations) may be generated based upon the measure of writing activity. A second set of representations may be generated based upon the measure of selecting activity. A third set of representations may be generated based upon the measure of consuming activity. A fourth set of representations may be generated based upon the measure of requesting activity. A fifth set of representations may be generated based upon the measure of transmission activity. Two or more sets of representations of the first set of representations, the second set of representations, the third set of representations, the fourth set of representations and/or the fifth set of representations may be combined to generate the first level of activity.

Alternatively and/or additionally, the first level of activity may be generated based upon a first set of biometric data associated with the user. For example, the first set of biometric data may be indicative of a heart-rate of the user, whether the user performed physical activity (e.g., physical exercise, including running, jogging, swimming, sports, walking, climbing stairs, cycling, yoga, etc.) prior to the first activity and/or while the first activity is performed, an amount of the physical activity (e.g., a quantity of miles run by the user, a quantity of miles jogged by the user, a quantity of miles swam by the user, etc.), a third duration of time that the physical activity is performed, a physical activity-rate (e.g., a quantity of miles run per hour, a quantity of miles swam per hour, etc.), etc.

For example, at least a portion of the first set of biometric data may be determined based upon biometric data received from an activity tracking device configured to monitor physical parameters associated with the user (e.g., the activity tracking device may be a wearable computer and/or sensor configured to monitor physical activity performed by the user, the heart-rate of the user, other bodily measure measurements associated with the user, such as blood pressure, etc.). Alternatively and/or additionally, at least a portion of the first set of biometric data may be determined by monitoring a location of the user (e.g., tracking a location of the first client device to determine whether changes in location of the first client device resembles the user running, jogging, walking, cycling, etc. and/or to determine whether the user is at a fitness facility, such as a gym, a yoga learning center, etc.). Alternatively and/or additionally, at least a portion of the first set of biometric data may be determined by monitoring user content associated with the user (e.g., emails, a web-based calendar, messages, etc. may be monitored to identify indications, such as calendar events indicative of physical activity, emails to contacts indicative of physical activity, etc. indicating that the user is performing physical activity).

Alternatively and/or additionally, the first level of activity may be generated based upon events, trips and/or traveling plans associated with the user. For example, locations and/or times associated with the events and/or trips may be determined by monitoring the web-based calendar associated with the user account, emails associated with the user account, messages associated with the user account, social media activity (e.g., social media activity posts), etc. to identify scheduled events (e.g., calendar events) associated with the events and/or trips, lodging reservations associated with the events and/or trips, rental car reservations associated with the events and/or trips, transportation reservations (e.g., flight reservations, train reservations, etc.) associated with the events and/or trip, etc. For example, the first level of activity may be generated based upon whether the first activity is performed during an event and/or a trip of the user, whether the first activity is performed within a fourth duration of time (e.g., 1 hour, 2 hours, 1 day, 2 days, etc.) after an event and/or a trip of the user, whether the first activity is performed within the fourth duration of time after an arrival time of a flight, etc. In some examples, events may comprise concerts, sports games, movies, etc.

The first activity may be associated with a first activity session. For example, the first activity session may be determined to be concluded responsive to detecting a period of inactivity that exceeds the first threshold duration of time. In some examples, the first level of activity may be modified and/or updated based upon a plurality of activity sessions. For example, a level of activity may be generated based upon each activity session of the plurality of activity sessions and/or may be incorporated into the first level of activity (e.g., the first level of activity may be modified and/or updated based upon levels of activity of the plurality of activity sessions). Accordingly, the first level of activity may become a more accurate representation of (typical) activity of the user over time.

Alternatively and/or additionally, the first activity profile may be indicative of a plurality of levels of activity, comprising the first level of activity. For example, each level of activity may be associated with a set of characteristics of a plurality of sets of characteristics (e.g., time of day, weather conditions, location, etc.). For example, the first level of activity may be associated with a first set of characteristics of the plurality of sets of characteristics. Responsive to detecting a second activity session, of the plurality of activity sessions associated with the first level of activity, one or more characteristics associated with the second activity session may be determined. The one or more characteristics may be compared with the plurality of sets of characteristics. The second activity session and/or a second level of activity associated with the second activity session may be used to supplement the first level of activity responsive to a determination that the one or more characteristics associated with the second activity session match the first set of characteristics associated with the first level of activity (e.g., the first level of activity may be modified and/or updated based upon the second level of activity based upon the determination that the one or more characteristics associated with the second activity session match the first set of characteristics associated with the first level of activity).

In some examples, each set of characteristics of the plurality of sets of characteristics may be associated with a time of day associated with a level of activity of the plurality of levels of activity. For example, the first set of characteristics may be associated with a first time of day. For example, the plurality of activity sessions associated with the first level of activity may be associated with the first time of day. For example, activity sessions of the plurality of activity sessions may be performed during the first time of day (e.g., early morning (5:00 AM-8:00 AM), morning (8:00 AM-11:00 AM), noon (11:00 AM-1:00 PM), afternoon (1:00 PM-5:00 PM), early evening (5:00 PM-7:00 PM), evening (7:00 PM-11:00 PM), late night (11:00 PM-5:00 AM), etc.).

Alternatively and/or additionally, each set of characteristics of the plurality of sets of characteristics may be associated with weather conditions associated with a level of activity of the plurality of levels of activity. For example, the first set of characteristics may be associated with a first set of weather conditions. For example, the plurality of activity sessions associated with the first level of activity may be associated with the first set of weather conditions. For example, activity sessions of the plurality of activity sessions may be performed while the first client device (and/or a different client device of the plurality of client devices associated with the user) is in a region having the first set of weather conditions (e.g., rainy, sunny, cloudy, snowy, cold, warm, windy, etc.).

Alternatively and/or additionally, each set of characteristics of the plurality of sets of characteristics may be associated with a location associated with a level of activity of the plurality of levels of activity. For example, the first set of characteristics may be associated with a first location. For example, the plurality of activity sessions associated with the first level of activity may be associated with the first location. For example, activity sessions of the plurality of activity sessions may be performed while the first client device (and/or a different client device of the plurality of client devices associated with the user) is at the first location (e.g., the first location may be determined to be a workplace and/or an office of the user, the first location may be determined to be a shopping center, the first location may be determined to be a park, the first location may be determined to be outside of the workplace and/or the office of the user, the first location may be determined to be outside of the home of the user, etc.).

At 408, second activity performed using the first content interface may be detected. For example, the second activity may comprise second selectable inputs of the first content interface (and/or a different content interface of the plurality of content interfaces associated with the system) being selected. Alternatively and/or additionally, the second activity may comprise second text being inputted into one or more second text areas of the first content interface (and/or a different content interface of the plurality of content interfaces). In some examples, the second activity may include activity performed using the first content interface (and/or a different content interface of the plurality of content interfaces) during a fourth duration of time. For example, the second activity may be monitored and/or analyzed (periodically) throughout the fourth duration of time. In some examples, the second activity may be associated with a third activity session. For example, the third activity session may be determined to be concluded responsive to detecting a period of inactivity that exceeds the first threshold duration of time.

In some examples, the second text being inputted into the one or more second text areas may be monitored and/or analyzed. For example, an amount of the second text, a second text-rate at which the second text is inputted into the one or more second text areas, a fourth instrument used for the inputting the second text into the one or more second text areas, a second distance between key strokes, a second key stroke effort, a second writing effort, etc. may be determined based upon the second activity. For example, a second measure of writing activity may be generated based upon the amount of the second text, the second text-rate at which the second text is inputted into the one or more second text areas, the fourth instrument used for the inputting the second text into the one or more second text areas, the second distance between key strokes, the second key stroke effort and/or the second writing effort. In some examples, during the third activity session, the second measure of writing activity may be updated periodically (e.g., every 30 seconds, every 1 minute, every 2 minutes, every 5 minutes, etc.) and/or periodically and/or responsive to detecting activity associated with the second activity.

Alternatively and/or additionally, second selections of second selectable inputs of the first content interface (and/or a different content interface of the plurality of content interfaces) may be monitored and/or analyzed. For example, an amount of the second selections of the second selectable inputs, a second selection-rate at which selections of the second selections are performed, a fifth instrument used for performing the second selections, a second number of steps associated with selections of the second selections, a second selection effort associated with the second selections, etc. may be determined based upon the second activity. For example, a second measure of selecting activity may be generated based upon the amount of the second selections, the second selection-rate at which selections of the second selections are performed, the fifth instrument used for performing the second selections, the second number of steps associated with selections of the second selections and/or the second selection effort associated with the second selections. In some examples, during the third activity session, the second measure of selecting activity may be updated periodically and/or responsive to detecting activity associated with the second activity.

Alternatively and/or additionally, second consuming activity associated with a second set of content items of the first content interface (and/or a different content interface of the plurality of content interfaces) being consumed may be monitored and/or analyzed. For example, a second amount of content associated with the second set of content items, a second consume-rate at which content items of the second set of content items are consumed, a sixth instrument used for consuming the second set of content items, a second consuming effort associated with the second set of content items being consumed, etc. may be determined based upon the second activity. For example, a second measure of consuming activity may be generated based upon the second amount of content associated with the second set of content items, the second consume-rate at which content items of the second set of content items are consumed, the sixth instrument used for consuming the second set of content items and/or the second consuming effort associated with the second set of content items being consumed. In some examples, during the third activity session, the second measure of consuming activity may be updated periodically and/or responsive to detecting activity associated with the second activity.

Alternatively and/or additionally, a second plurality of requests received from the first client device during the third activity session may be monitored and/or analyzed. For example, a second quantity of requests of the second plurality of requests, a second request-rate at which requests of the second plurality of requests are received from the first client device, etc. may be determined based upon the second activity. For example, a second measure of requesting activity may be generated based upon the second quantity of requests of the second plurality of requests and/or the second request-rate at which requests of the second plurality of requests are received from the first client device. In some examples, during the third activity session, the second measure of requesting activity may be updated periodically and/or responsive to detecting activity associated with the second activity.

Alternatively and/or additionally, a second plurality of transmissions of items associated with the second activity may be monitored and/or analyzed. For example, a second quantity of transmissions of items of the second plurality of transmissions of items, a second transmission-rate at which items are transmitted, etc. may be determined based upon the second activity. For example, a second measure of transmission activity may be generated based upon the second quantity of transmissions of items of the second plurality of transmissions of times and/or the second transmission-rate at which items are transmitted. In some examples, during the third activity session, the second measure of transmission activity may be updated periodically and/or responsive to detecting activity associated with the second activity.

At 410, the second activity may be analyzed to determine a third level of activity associated with the second activity. For example, the third level of activity may be generated based upon the second measure of writing activity, the second measure of selecting activity, the second measure of consuming activity, the second measure of requesting activity and/or the second measure of transmission activity. Alternatively and/or additionally, the third level of activity may be generated by combining two or more of the second measure of writing activity, the second measure of selecting activity, the second measure of consuming activity, the second measure of requesting activity and/or the second measure of transmission activity. Alternatively and/or additionally, the third level of activity may be generated based upon a second set of biometric data (associated with the user during the fourth duration of time of the third activity session and/or prior to the fourth duration of time) and/or the events, trips and/or the traveling plans associated with the user. Alternatively and/or additionally, the third level of activity may be updated and/or modified periodically and/or responsive to detecting activity associated with the second activity.

Alternatively and/or additionally, one or more first characteristics associated with the second activity may be determined. For example, the one or more first characteristics may be associated with a second time of day associated with the third activity session (e.g., the second activity may be performed during the second time of day). Alternatively and/or additionally, the one or more first characteristics may be associated with a second set of weather conditions (e.g., the second activity may be performed while the first client device is in a region having the second set of weather conditions). Alternatively and/or additionally, the one or more first characteristics may be associated with a second location (e.g., the second activity may be performed while the first client device is at the second location).

At 412, the first level of activity may be compared with the third level of activity to determine a difference between the first level of activity and the third level of activity. In some examples, the first level of activity and/or the first activity profile may be identified and/or compared with the third level of activity responsive to a determination that the first activity profile is associated with the second activity. For example, the first level of activity and/or the first activity profile may be selected for comparison with the third level of activity based upon identification information associated with the first activity profile comprised within an activity profile database.

Alternatively and/or additionally, rather than comparing the third level of activity with the first level of activity of the first activity profile, the third level of activity may be compared with a global level of activity. For example, the global level of activity may be associated with levels of activity of a plurality of users of the first content interface (e.g., the global level of activity may be an average level of activity of the levels of activity associated with the plurality of users). In some examples, the global level of activity may be used in cases where an activity profile is not available for use.

In some examples, the activity profile database may comprise a plurality of activity profiles, including the first activity profile. For example, activity profiles of the plurality of activity profiles, excluding the first activity profile, may be associated with other users different than the user, other user accounts different than the user account and/or other client devices different than the plurality of client devices. The first activity profile may comprise the identification information, which may be used to identify activity associated with the plurality of client devices (associated with the user) and/or the user account.

For example, the identification information may comprise a first set of client identifiers associated with the first client device. For example, the first set of client identifiers may comprise a first Internet Protocol (IP) address associated with the first client device, first device capability information, first carrier information and/or one or more other types of client device information. For example, the first set of client identifiers may comprise an indication of first applications (e.g., software applications) that are opened upon startup of the first client device (e.g., the first applications may be opened and/or activated responsive to the first client device being turned on, the first client device being logged in, etc.). Alternatively and/or additionally, the first set of client identifiers may comprise a first arrangement of icons associated with the first client device (e.g., the first arrangement of icons may correspond to an arrangement in which icons are displayed and/or stored in the first client device such as in a desktop of the first client device, a home directory and/or home screen of the first client device, and/or a different directory of the first client device).

Alternatively and/or additionally, the identification information may comprise a plurality of sets of client identifiers, including the first set of client identifiers, associated with the plurality of client devices associated with the user. Alternatively and/or additionally, the identification information (and/or the first activity profile) may be indicative of the user account (associated with the user). For example, the first level of activity and/or the first activity profile may be selected for comparison with the third level of activity responsive to determining that the second activity is performed by a device associated with the user account (e.g., the first client device may be logged into the user account). Alternatively and/or additionally, the first level of activity and/or the first activity profile may be selected for comparison with the third level of activity responsive to determining that the second activity is performed by a device having one or more properties matching a set of client identifiers of the plurality of sets of client identifiers (e.g., it may be determined that the device is the first client device by determining that an IP address of the device matches the first IP address associated with the first client device, by determining that device capability information of the device matches the first device capability information of the first client device, by determining that carrier information of the device matches the first carrier information of the first client device, by determining that applications opened upon startup of the device matches the first applications of the first client device, by determining that an arrangement of icons of the device matches the first arrangement of icons of the first client device, etc.).

Alternatively and/or additionally, the first level of activity may be selected from the plurality of levels of activity for comparison with the third level of activity based upon the one or more first characteristics. For example, the one or more first characteristics may be compared with the plurality of sets of characteristics (corresponding to the plurality of levels of activity). For example, the first level of activity may be selected from the plurality of levels of activity for comparison with the third level of activity based upon a determination that the one or more first characteristics matches the first set of characteristics associated with the first level of activity. Alternatively and/or additionally, the determination that the one or more first characteristics matches the first set of characteristics may comprise determining that merely one or more characteristics of the one or more first characteristics matches one or more characteristics of the first set of characteristics. Alternatively and/or additionally, the determination that the one or more first characteristics matches the first set of characteristics may comprise determining that a level of closeness between the one or more first characteristics and the first set of characteristics is greater than levels of closeness between the one or more first characteristics and other sets of characteristics of the plurality of sets of characteristics.

For example, the first level of activity may be selected from the plurality of levels of activity for comparison with the third level of activity based upon a determination that the second time of day associated with the third activity session matches the first time of day associated with the first level of activity. Alternatively and/or additionally, the first level of activity may be selected from the plurality of levels of activity for comparison with the third level of activity based upon a determination that the second set of weather conditions associated with the third activity session matches the first set of weather conditions associated with the first level of activity. Alternatively and/or additionally, the first level of activity may be selected from the plurality of levels of activity for comparison with the third level of activity based upon a determination that the second location associated with the third activity session matches the first location associated with the first level of activity.

At 414, it may be determined that the difference between the first level of activity and the third level of activity is greater than a threshold difference. For example, it may be determined that the third level of activity exceeds the first level of activity (and/or the global level of activity if the global level of activity is used instead of the first level of activity) by the threshold difference. Alternatively and/or additionally, it may be determined that the third level of activity exceeds the first level of activity by any amount (e.g., the threshold difference may be zero). The third level of activity may be indicative of a level of exhaustion of the user. Alternatively and/or additionally, the third level of activity exceeding the first level of activity by the threshold difference may be indicative of the level of exhaustion of the user exceeding a threshold level of exhaustion, where the user may make mistakes when interacting with the first content interface (and/or a different content interface of the plurality of content interfaces). For example, the third level of activity exceeding the first level of activity by the threshold difference may indicate that the user performed more activity than the user normally performs (during the first time of day, while the first client device is in a region having the first set of weather conditions, while the first client device is at the first location, etc.), which may make the user prone to mistakes while interacting with the first content interface (and/or a different content interface of the plurality of content interfaces) (e.g., a level of attentiveness and/or concentration of the user may be low when the level of exhaustion of the user exceeds the threshold level of exhaustion, the user may become easily distracted when the level of exhaustion of the user exceeds the threshold level of exhaustion, etc.).

At 416, responsive to determining that the difference between the first level of activity and the third level of activity is greater than the threshold difference, the first content interface may be modified to a modified version of the first content interface. For example, the modified version of the first content interface may be associated with an exhaustion management mode which may be implemented to prevent mistakes from occurring.

Alternatively and/or additionally, the activity profile may be indicative of a daily level of activity. For example, the daily level of activity may be indicative of a level of activity associated with the user account and/or the first client device that is performed within a day. For example, the first content interface may be modified to the modified version of the first content interface responsive to a determination that activity associated with user account and/or the first client device, performed during a single day, has exceeded the daily level of activity by the threshold difference (and/or a second threshold difference different than the threshold difference). It may be appreciated that instead of and/or in addition to the daily level of activity, the activity profile may similarly be indicative of a level of activity for a period of time other than (e.g., less than, greater than) a day, such as an hourly level of activity, a weekly level of activity, etc.

Alternatively and/or additionally, it may be determined that the first client device (and/or the user) is located in an area associated with the user being served alcoholic beverages (e.g., the area may be associated with a bar and/or a different establishment that serves alcoholic beverages). In some examples, the first content interface may be modified to the modified version of the first content interface responsive to a determination that the first client device is in the area associated with the user being served alcoholic beverages (e.g., the user being served alcoholic beverages may be determined make the user prone to mistakes).

Alternatively and/or additionally, the first content interface may be modified to the modified version of the first content interface based upon the second set of biometric data. For example, the first content interface may be modified to the modified version of the first content interface based upon a determination that the heart-rate of the user is higher than a threshold heart-rate, that the heart-rate of the user is lower than a second threshold heart-rate, that the level of exhaustion of the user is higher than the threshold level of exhaustion (which may be determined based upon the second set of biometric data), etc. Alternatively and/or additionally, the first content interface may be modified to the modified version of the first content interface based upon a determination that the user performed second physical activity prior to the third activity session and/or during the third activity. Alternatively and/or additionally, the first content interface may be modified to the modified version of the first content interface based upon a determination that an amount of the second physical activity is greater than a threshold amount of physical activity and/or that a second physical activity-rate of the second physical activity is greater than a threshold physical activity-rate.

Alternatively and/or additionally, the first content interface may be modified to the modified version of the first content interface based upon the events, the trips and/or the traveling plans associated with the user. For example, it may be determined that a mode of transportation of a first trip to a third location is traveling by car. In some examples, the first content interface may be modified to the modified version of the first content interface responsive to a determination that the user is traveling by car during the third activity session and/or that the third activity session is performed within the fourth duration of time after the user has reached the third location (e.g., the user may be exhausted while traveling by car and/or within the fourth duration of time after traveling by car).

Alternatively and/or additionally, it may be determined that the mode of transportation of the first trip is traveling by plane (and/or a different mode of transportation). For example, the first content interface may be modified to the modified version of the first content interface responsive to a determination that the user is traveling by plane during the third activity session and/or that the third activity session is performed within the fourth duration of time after the user has reached the third location (e.g., the user may be exhausted while traveling by plane and/or within the fourth duration of time after traveling by plane).

Alternatively and/or additionally, the first content interface may be modified to the modified version of the first content interface based upon one or more other factors that may cause the user to become exhausted. For example, the web-based calendar associated with the user account, emails associated with the user account, messages associated with the user account, social media activity, etc. may be analyzed to determine the one or more other factors (e.g., that the user is assigned an assignment that needs to be submitted by a deadline, that the user has a meeting scheduled, etc.).

In some examples, the first content interface may be modified to the modified version of the first content interface by activating one or more first functions associated with the first content interface. For example, the one or more first functions may be configured to assist the user in performing tasks using the modified version of the first content interface and/or may be configured to prevent mistakes from occurring.

For example, the one or more first functions may comprise a first function. The first function may be associated with a spell check function. For example, the first function may be configured to analyze third text inputted into one or more third text areas of the content interface to identify one or more incorrectly spelled words within the third text (e.g., the one or more incorrectly spelled words may be compared with a database of words, such as a dictionary, and it may be determined that the one or more incorrectly spelled words do not match entries of the database of words). For example, responsive to identifying an incorrectly spelled word within the third text, the incorrectly spelled word may be automatically modified to a corrected word (e.g., a word from the database of words which resembles the incorrectly spelled word). Alternatively and/or additionally, responsive to identifying the incorrectly spelled word, a first notification may be displayed identifying the incorrectly spelled word and/or one or more words (comprising the corrected word) from the database of words that resemble the incorrectly spelled word.

Alternatively and/or additionally, the one or more first functions may comprise a second function. The second function may be configured to analyze fourth text inputted into one or more fourth text areas to identify one or more sets of text associated with a contact of the user account. For example, the one or more fourth text areas may correspond to text areas of an email interface, a messaging interface, etc. where an email and/or a message is being composed. In an example, the fourth text may comprise "Hey all, the report isn't so bad. I think John and Quinn should take a look at it though.". The one or more sets of text may comprise a first set of text "John" and/or a second set of text "Quinn". For example, "John" may correspond to a first contact of the user account (e.g., the first contact may correspond to a second user account that is in communication with the user account via email, messaging, etc.). Alternatively and/or additionally, "Quinn" may correspond to a second contact of the user account. For example, a contact list associated with the user account may be analyzed to determine the first contact (e.g., "johnderier@email.com") based upon the first set of text and/or the second contact (e.g., "quinndiggle@email.com") based upon the second set of text (e.g., at least a portion of the first contact may match the first set of text and/or at least a portion of the second contact may match the second set of text).

In some examples, a recipient list (e.g., a "To" field associated with an email, a "CC" field associated with the email, a "BCC" field associated with the email, a "To" field associated with a message, etc.) may be analyzed to determine whether the one or more contacts are included in the recipient list. It may be determined that the first contact is included in the recipient list and/or that the second contact is not included in the recipient list. A second notification may be displayed indicative of the second contact not being comprised within the recipient list. In some examples, the second notification may be displayed responsive to receiving a second request to send the email and/or the message (e.g., the second request may be received responsive to a selection of a third selectable input corresponding to sending the email and/or the message).

Alternatively and/or additionally, the one or more first functions may comprise a third function. For example, the third function may be configured to analyze the fourth text inputted into the one or more fourth text areas to identify one or more second sets of text of the email and/or the message associated with an attachment. For example, the one or more second sets of text may comprise a third set of text comprising "The report is attached". It may be determined that the attachment is not comprised within an attachment list associated with the email and/or the message. In an example, it may be determined that the attachment list does not include any attachments. For example, a third notification may be displayed. The third notification may be indicative of the email and/or the message not comprising any attachments. Alternatively and/or additionally, the third notification may be indicate that the email and/or the message does not comprise an attachment associated with the third set of text (e.g., the third set of text may be analyzed to determine that an attachment associated with "report" should be attached to the email and/or the message).

Alternatively and/or additionally, it may be determined that the attachment list comprises one or more attachments. The one or more attachments may be analyzed to determine if the one or more attachments are associated with the third set of text (e.g., if names of the one or more attachments comprises "report"). Responsive to a determination that the one or more attachments are not associated with the third set of text (e.g., that the names of the one or more attachments do not comprise "report"), the third notification may be displayed. The third notification may indicate that the email and/or the message does not comprise an attachment associated with the third set of text. In some examples, the third notification may be displayed responsive to receiving the second request to send the email and/or the message.

Alternatively and/or additionally, the one or more first functions may comprise a fourth function. For example, the fourth function may be configured to analyze the fourth text inputted into the one or more fourth text areas to identify one or more third sets of text of the email and/or the message associated with an item (e.g., a link to a web page, an image, a gif, an audio file, a set of contact information such as a phone number, an email address, a fax number, a mailing address, etc.). For example, the one or more third sets of text may comprise "Please call me on my cell phone using the number below". It may be determined that the item (e.g., a phone number) is not comprised within the email and/or the message. Responsive to determining that the item is not comprised within the email and/or the message, a fourth notification may be displayed indicating that the item is not comprised within the email and/or the message. The fourth notification may be displayed responsive to receiving the second request to send the email and/or the message.

Alternatively and/or additionally, the one or more first functions may comprise a fifth function. For example, the fifth function may be configured to analyze the fourth text inputted into the one or more fourth text areas to identify one or more fourth sets of text of the email and/or the message comprising profane language. Responsive to identifying profane language within the email and/or the message, a fifth notification may be displayed indicating that the email and/or the message comprises profane language. The fifth notification may be displayed responsive to receiving the second request to send the email and/or the message. Alternatively and/or additionally, the email and/or the message comprising the profane language may not be transmitted. Alternatively and/or additionally, transmission of the email and/or the message may be delayed such that the user is able to cancel transmission of the email and/or the message before it is transmitted.

Alternatively and/or additionally, the one or more first functions may comprise a sixth function. The sixth function may be configured to identify a second message (e.g., an email associated with an email service, a message associated with a messaging service, etc.) received by the user account from a fourth user account (and/or a second client device associated with the fourth user account). The second message may be analyzed to determine an importance associated with the second message. For example, it may be determined that the importance of the second message is less than a threshold importance. For example, the importance of the second message may be determined based upon an amount of communication (e.g., email activity, messaging activity, voice calls, video calls, etc.) between the user account and the fourth user account (and/or the threshold importance may be associated with a threshold amount of communication).

Alternatively and/or additionally, the importance of the second message may be determined based upon a type of relationship between the user account (and/or the user) and the fourth user account (and/or a second user associated with the fourth user account). For example, if the type of relationship is a first type of relationship (e.g., social relationship, working relationship, etc.) then the importance of the second message may be determined to be greater than the threshold importance. Alternatively and/or additionally, if the type of relationship is a second type of relationship (e.g., social relationship, working relationship, etc.) then the importance of the second message may be determined to be less than the threshold importance.

Alternatively and/or additionally, the importance of the second message may be determined by analyzing the second message. For example, responsive to a determination that the second message comprises one or more fifth sets of text indicating that the second message is important and/or urgent (e.g., if the second message and/or a subject line of the second message comprises one or more keywords, such as "important", "urgent", "ASAP", etc.), the importance of the second message may be determined to be greater than the threshold importance. Alternatively and/or additionally, responsive to a determination that the second message does not comprise a set of text indicating that the second message is important and/or urgent, the importance of the second message may be determined to be less than the threshold importance.

In some examples, responsive to determining that the importance of the second message is less than the threshold importance, the sixth function may delay providing a sixth notification associated with the second message (e.g., the sixth function may delay transmission of the sixth notification to the first client device, the sixth function may delay displaying the sixth notification using the first client device, etc.). For example, the sixth notification may be provided (e.g., transmitted to the first client device, displayed using the first client device, etc.) at a time determined to be convenient for the user. For example, the activity profile may be analyzed to determine one or more levels of activity of the plurality of levels of activity exceeding a threshold level of activity. For example, the one or more levels of activity may be associated with one or more times of day that the user typically interacts with the first content interface (and/or a different content interface of the plurality of content interfaces). For example, the sixth notification may be provided during the one or more times of day (e.g., providing the sixth notification may be delayed until the one or more times of day).

In an example, the one or more times of day may comprise times of day between 8:00 AM and 5:00 PM (e.g., the first activity profile may be indicative of the one or more levels of activity associated with the one or more times of day being higher than the threshold level of activity). Accordingly, the user may typically interact with the first content interface from 8:00 AM until 5:00 PM. However, the second message may be received at 1:00 AM and/or at a different time after the third level of activity associated with the third activity session has exceeded the first level of activity by the difference threshold. Accordingly, the providing the sixth notification associated with the second message may be delayed until 8:00 AM (and/or a different time during the one or more times of day).

Alternatively and/or additionally, the second set of biometric data may be used to determine whether the user is sleeping. For example, responsive to a determination that the user is sleeping when the second message is identified, the providing the sixth notification associated with the second message may be delayed until the one or more times of day. Alternatively and/or additionally, the providing the sixth notification associated with the second message may be delayed until it is determined that the user is awake (based upon the second set of biometric data).

Alternatively and/or additionally, providing the sixth notification may not be delayed. For example, the sixth notification may comprise an indication that the importance of the second message is less than the threshold importance and/or that it may not be necessary for the user to consume the second message and/or respond to the second message until later (e.g., until the one or more times of day).

Alternatively and/or additionally, the one or more first functions may comprise a seventh function. For example, the seventh function may be configured to receive a selection of a fourth selectable input corresponding to a third request to perform an action. For example, the third request to perform the action may comprise a request to delete a content item (e.g., a request to delete an email, a message, a file, etc.), a request to change settings associated with the user account, a request to move a content item from a first directory to a second directory, etc. Responsive to receiving the third request to perform the action, a seventh notification corresponding to the action may be displayed. For example, the seventh notification may be associated with confirmation to perform the action. For example, the seventh notification may comprise a fifth selectable input corresponding to a confirmation of the request to perform the action (e.g., delete a content item, change settings associated with the user account, move a content item to a different directory, etc.). For example, responsive to a selection of the fifth selectable input, the action may be performed. Alternatively and/or additionally, the seventh notification may comprise a sixth selectable input corresponding a request to not perform the action. For example, responsive to a selection of the sixth selectable input, the action may not be performed.

Alternatively and/or additionally, the seventh function may delay providing (e.g., displaying) the seventh notification until after a fifth duration of time after the selection of the sixth selectable input. For example, the seventh notification may be provided during the one or more times of day.

Alternatively and/or additionally, the first content interface may be modified to the modified version of the first content interface by deactivating one or more second functions associated with the first content interface. For example, the one or more second functions may comprise one or more functions for deleting content items, changing settings associated with the user account, transmitting content items, transferring funds from a banking account associated with the user account to a different banking account, etc. Alternatively and/or additionally, the first content interface may be modified to the modified version of the first content interface by restricting access of the first client device from one or more sets of resources (e.g., resources for deleting content items, changing settings associated with the user account, transmitting content items, transferring funds from a banking account associated with the user account to a different banking account, etc.) of a plurality of sets of resources associated with the first content interface.

Alternatively and/or additionally, a modified version settings interface may be provided by the first content interface (and/or the modified version of the first content interface). For example, the modified version of the first content interface may be disabled via the modified version settings interface. For example, responsive to a selection of one or more first selectable inputs of the modified version settings interface, the modified version of the first content interface may be modified to a normal version of the first content interface. For example, responsive to a selection of the one or more first selectable inputs, the one or more first functions may be deactivated, the one or more second functions may be activated and/or the first client device may be provided with access to the one or more sets of resources of the plurality of sets of resources. Alternatively and/or additionally, responsive to a selection of one or more second selectable inputs of the modified version settings interface, merely a portion of the one or more first functions may be deactivated, merely a portion of the one or more second functions may be activated and/or the first client device may be provided with access to merely a portion of the one or more sets of resources of the plurality of sets of resources.

Alternatively and/or additionally, the modified version of the first content interface may be (further) modified based upon the third level of activity. For example, responsive to determining that the third level of activity exceeds the first level of activity by a second threshold difference (greater than the threshold difference) the modified version of the first content interface may be modified to a second modified version of the first content interface. Alternatively and/or additionally, the third level of activity exceeding the first level of activity by the second threshold difference may be indicative of the level of exhaustion of the user exceeding a second threshold level of exhaustion (greater than the threshold level of exhaustion). For example, the modified version of the first content interface may be modified to the second modified version of the first content interface by activating one or more third functions associated with the first content interface, deactivating one or more fourth functions associated with the first content interface and/or restricting access of the first client device from one or more second sets of resources of the plurality of sets of resources associated with the first content interface.

FIGS. 5A-5H illustrate examples of a system 501 for modifying content interfaces based upon levels of activity. A user, such as user Jack, (e.g., and/or a first client device 500 associated with the user) may access and/or interact with a first content interface for consuming and/or creating content, communicating with other users, etc. For example, the first content interface may be an email application and/or the content may comprise emails. In some examples, the first client device 500 may comprise a microphone 506, a speaker 514 and/or a button 502 (e.g., a switch). In some examples, a first request to access the first content interface may be received from the first client device 500.

Figure 5A:
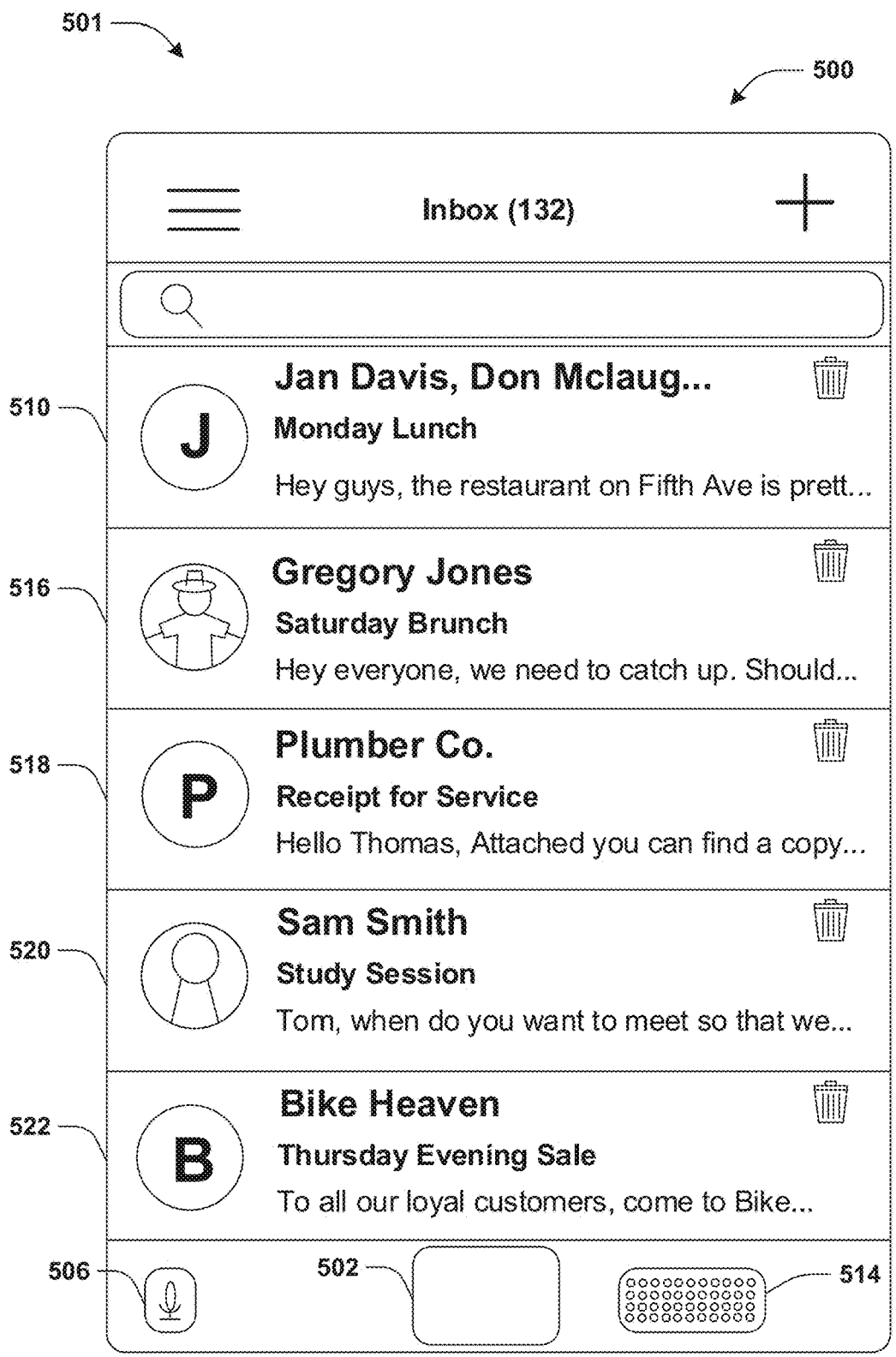
FIG. 5A is a component block diagram illustrating an example system for modifying content interfaces based upon levels of activity, where a graphical user interface of a first client device is controlled to display a first content interface.

FIG. 5A illustrates a graphical user interface of the first client device 500 being controlled to display the first content interface. For example, the first content interface may comprise a list of content items comprising a plurality of content items of a content items database associated with the first content interface and/or the user account. For example, the plurality of content items may comprise a first email item 510, a second email item 516, a third email item 518, a fourth email item 520 and/or a fifth email item 522. In some examples, each content item of the plurality of content items may comprise a selectable input corresponding to deleting a content item.

First activity performed using the first content interface may be detected. For example, the first activity may comprise selectable inputs of the first content interface being selected (e.g., clicked, pressed, etc.) using a touchscreen (e.g., of the first client device), one or more switches (e.g., one or more buttons), a conversational interface (e.g., a voice recognition and natural language interface), etc. For example, the selectable inputs may correspond to one or more email items of the plurality of content items, one or more settings associated with the user account, one or more actions such as deleting one or more email items, etc. Alternatively and/or additionally, the first activity may comprise text being inputted into one or more text areas of the first content interface (e.g., for composing one or more email messages).

In some examples, the first activity may be associated with a first activity session. For example, the first activity session may be determined to be concluded responsive to detecting a period of inactivity that exceeds the first threshold duration of time. In some examples, the first activity may be monitored and/or analyzed to determine a measure of writing activity, a measure of selecting activity, a measure of consuming activity, a measure of requesting activity and/or a measure of transmission activity associated with the first activity. Alternatively and/or additionally, a first level of activity may be generated based upon the first activity. For example, the first level of activity may be generated based upon the measure of writing activity, the measure of selecting activity, the measure of consuming activity, the measure of requesting activity and/or the measure of transmission activity associated with the first activity. In some examples, the first level of activity may be updated and/or modified periodically and/or responsive to detecting activity associated with the first activity.

FIG. 5B illustrates a backend system 550 of the first content interface selecting a second level of activity 554 for comparison with the first level of activity. For example, the backend system 550 may determine a first set of characteristics 552 associated with the first activity session. For example, the first set of characteristics 552 may indicate that the first activity is performed during a first time of day (e.g., 9:00 PM to 12:00 AM). Alternatively and/or additionally, the first set of characteristics 552 may indicate that prior to the first activity session, the user performed physical activity (e.g., running 7.6 miles) (e.g., the physical activity may be determined based upon a set of biometric data). Alternatively and/or additionally, the first set of characteristics 552 may indicate that during the third activity session, the first client device 500 and/or the user is at a first location (e.g., a home of the user).

In some examples, the second level of activity 554 "LEVEL OF ACTIVITY 4" may be selected for comparison with the first level of activity. For example, the first set of characteristics 552 may be compared with a plurality of sets of characteristics of an activity profile associated with the user account and/or the first client device 500. For example, the second level of activity 554 may be selected for comparison with the first level of activity based upon a determination that the first set of characteristics 552 matches a second set of characteristics associated with the second level of activity 554.

In some examples, the first level of activity may be compared with the second level of activity 554 to determine a difference between the first level of activity and the second level of activity 554. It may be determined that the difference between the first level of activity and the second level of activity 554 is greater than a threshold difference. For example, it may be determined that the first level of activity exceeds the second level of activity 554 by the threshold difference. For example, the first level of activity exceeding the second level of activity 554 by the threshold difference may be indicative of a level of exhaustion of the user exceeding a threshold exhaustion level, where the user may make mistakes when interacting with the first content interface. Responsive to determining that the difference between the first level of activity and the second level of activity 554 is greater than the threshold difference and/or that the first level of activity exceeds the second level of activity 554, the first content interface may be modified to a modified version of the first content interface. The modified version of the first content interface may be associated with an exhaustion management mode.

Figure 5C:
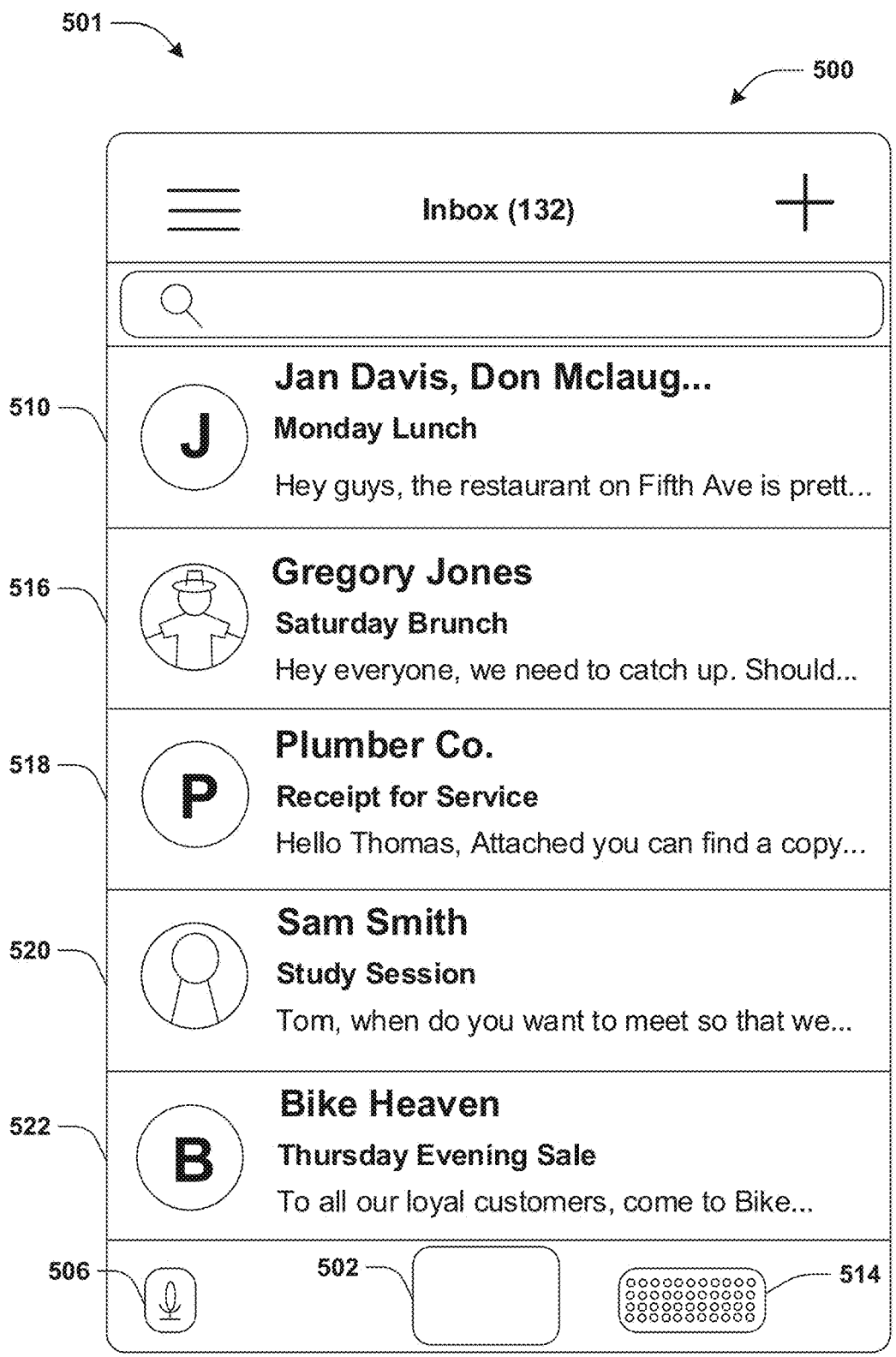
FIG. 5C is a component block diagram illustrating an example system for modifying content interfaces based upon levels of activity, where a graphical user interface of a first client device is controlled to display a modified version of a first content interface.

FIG. 5C illustrates the graphical user interface of the first client device 500 being controlled to display the modified version of the first content interface. For example, in order to prevent mistakes such as accidentally deleting a content item, the first content interface may not comprise selectable inputs corresponding to deleting content items within the list of content items. For example, in order to delete a content item, a selection of the content item may be received and/or a content item interface associated with the content item may be displayed responsive to the selection of the content item. The content item may (then) be deleted from within the content item interface. For example, a selection of the first email item 510 may be received via the list of content items.

Figure 5D:
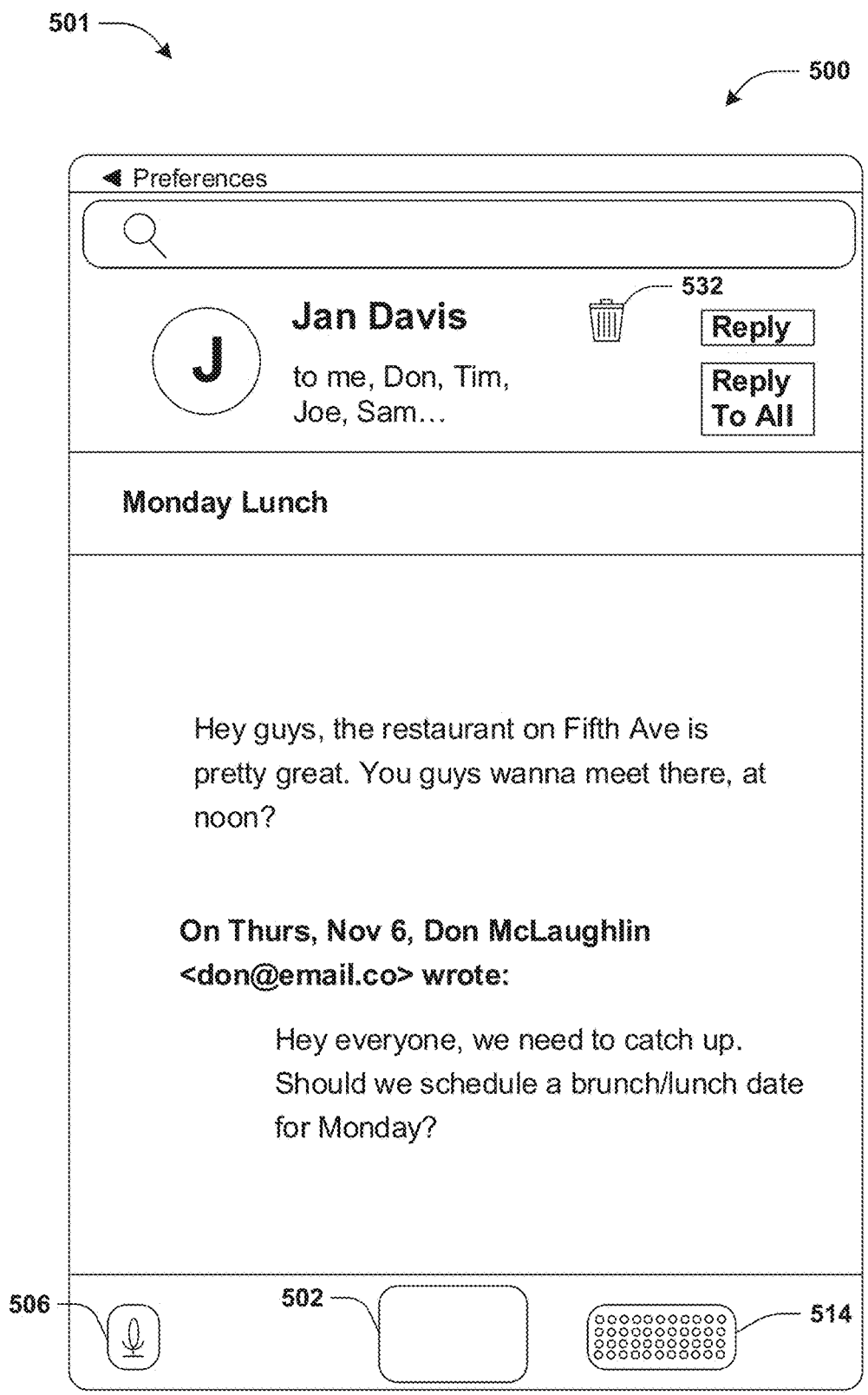
FIG. 5D is a component block diagram illustrating an example system for modifying content interfaces based upon levels of activity, where a graphical user interface of a first client device is controlled to display a first content item interface associated with an email item.

FIG. 5D illustrates the graphical user interface of the first client device 500 being controlled to display a first content item interface associated with the first email item 510. For example, the first email item 510 may be associated with an email conversation. In some examples, the first content item interface may comprise a first selectable input 532 corresponding to a request for deleting the first email item 510. For example, a selection of the first selectable input 532 may be received.

Figure 5E:
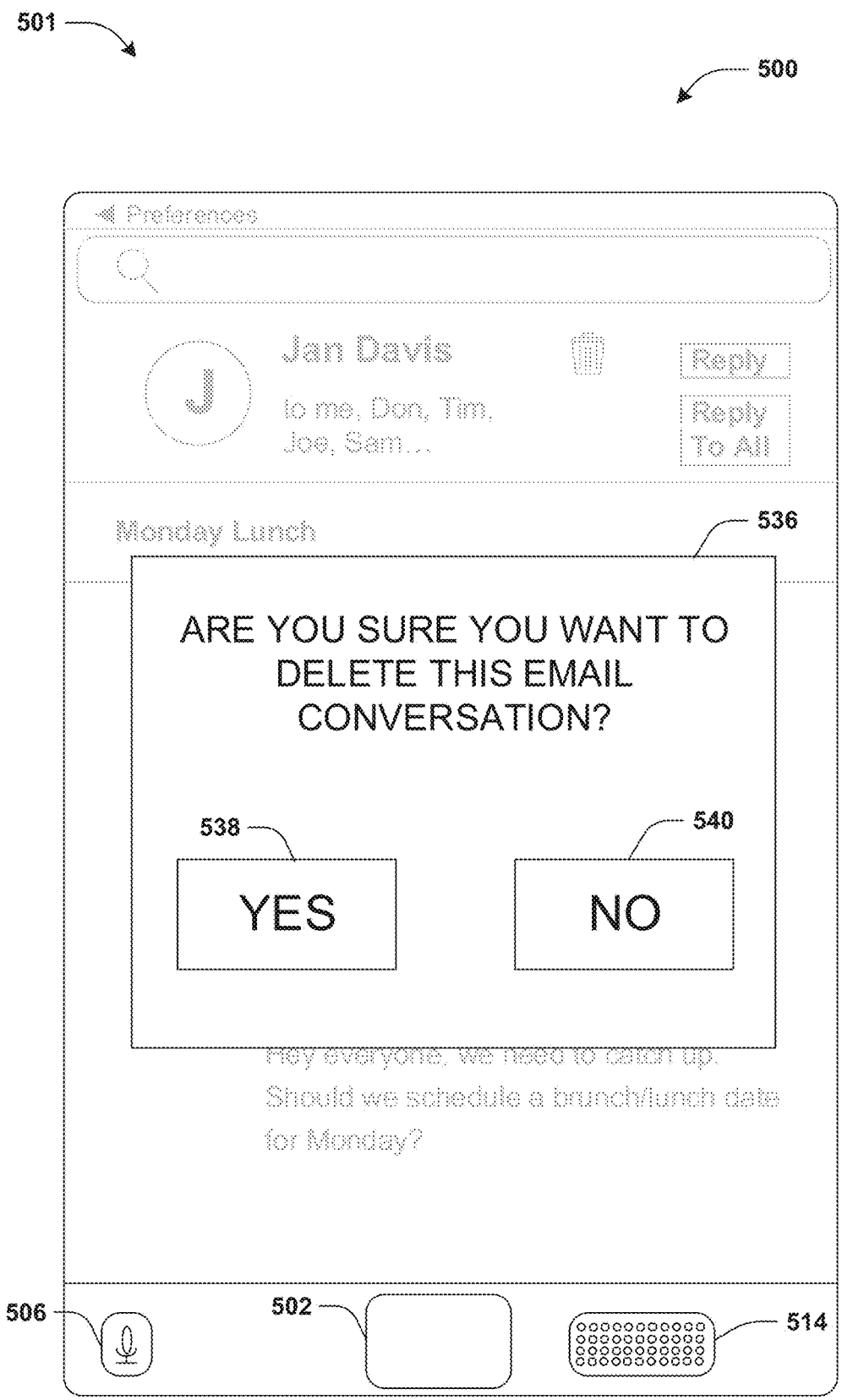
FIG. 5E is a component block diagram illustrating an example system for modifying content interfaces based upon levels of activity, where a graphical user interface of a first client device is controlled to display a first notification.

FIG. 5E illustrates the graphical user interface of the first client device 500 being controlled to display a first notification 536. For example, the first notification 536 may be displayed responsive to receiving the selection of the first selectable input 532. The first notification 536 may be associated with a confirmation to delete the first email item 510. For example, the first notification 536 may comprise a second selectable input 538 and/or a third selectable input 540. For example, the second selectable input 538 may correspond to a confirmation of the request to delete the first email item 510. Alternatively and/or additionally, the third selectable input 540 may correspond to not deleting the first email item 510. In some examples, a selection of the second selectable input 538 may be received.

Figure 5F:
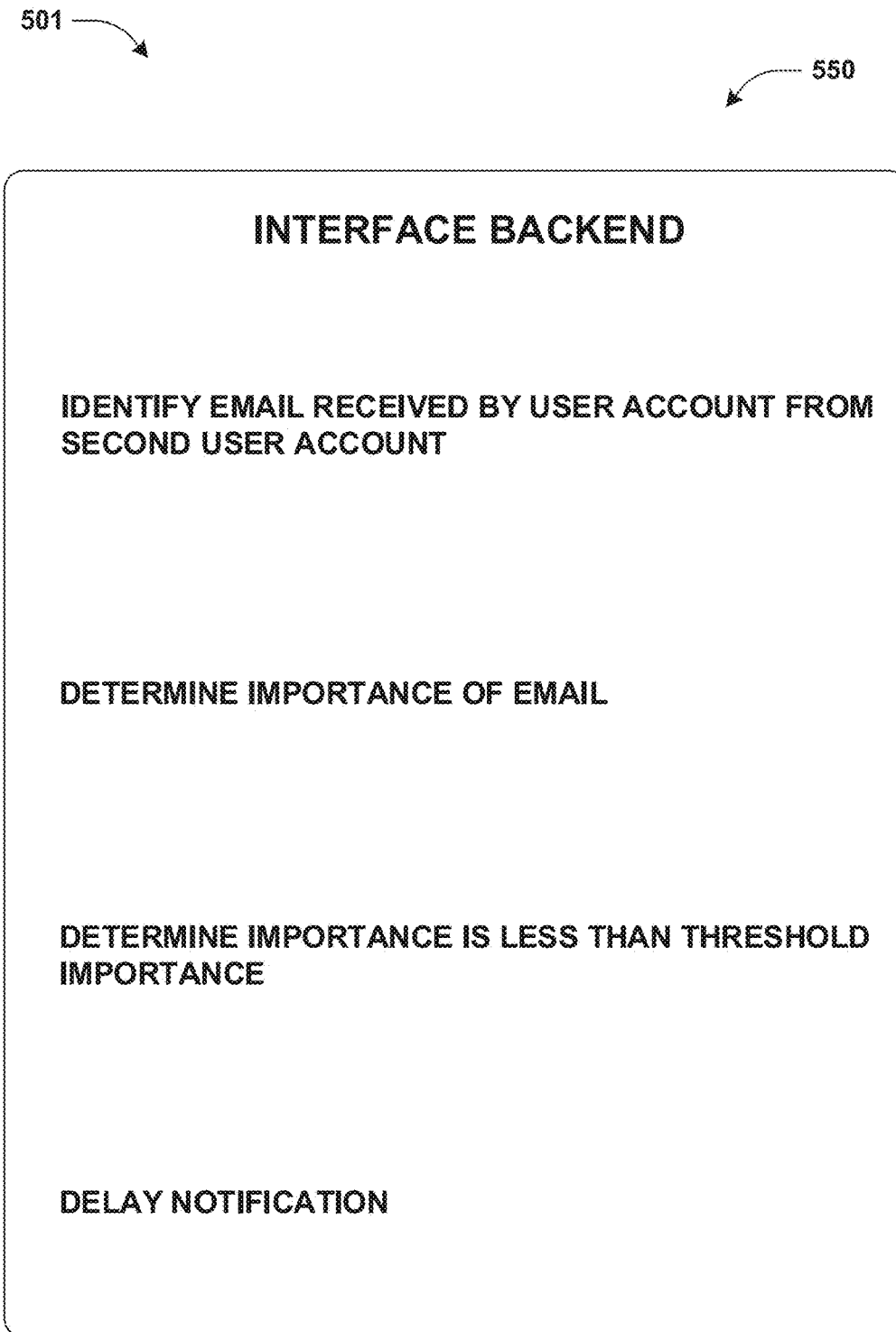
FIG. 5F is a component block diagram illustrating an example system for modifying content interfaces based upon levels of activity, where a backend system receives an email from a second user account after it is determined that a first level of activity exceeds a second level of activity.

FIG. 5F illustrates the backend system 550 of the first content interface receiving an email from a second user account after it is determined that the first level of activity exceeds the second level of activity 554. An importance of the email may be determined. The importance of the email may be determined based upon an amount of communication between the user account and the second user account, based upon a type of relationship between the user account and the second user account, based upon content of the email, etc. For example, it may be determined that the importance of the email is less than a threshold importance. Responsive to determining that the importance of the email is less than the threshold importance, providing a second notification 544 (illustrated in FIG. 5G) associated with the email may be delayed until one or more times of day associated with one or more levels of activity of the activity threshold exceeding a threshold level of activity. For example, transmission of the second notification 544 to the first client device 500 may be delayed until the one or more times of day.

Figure 5G:
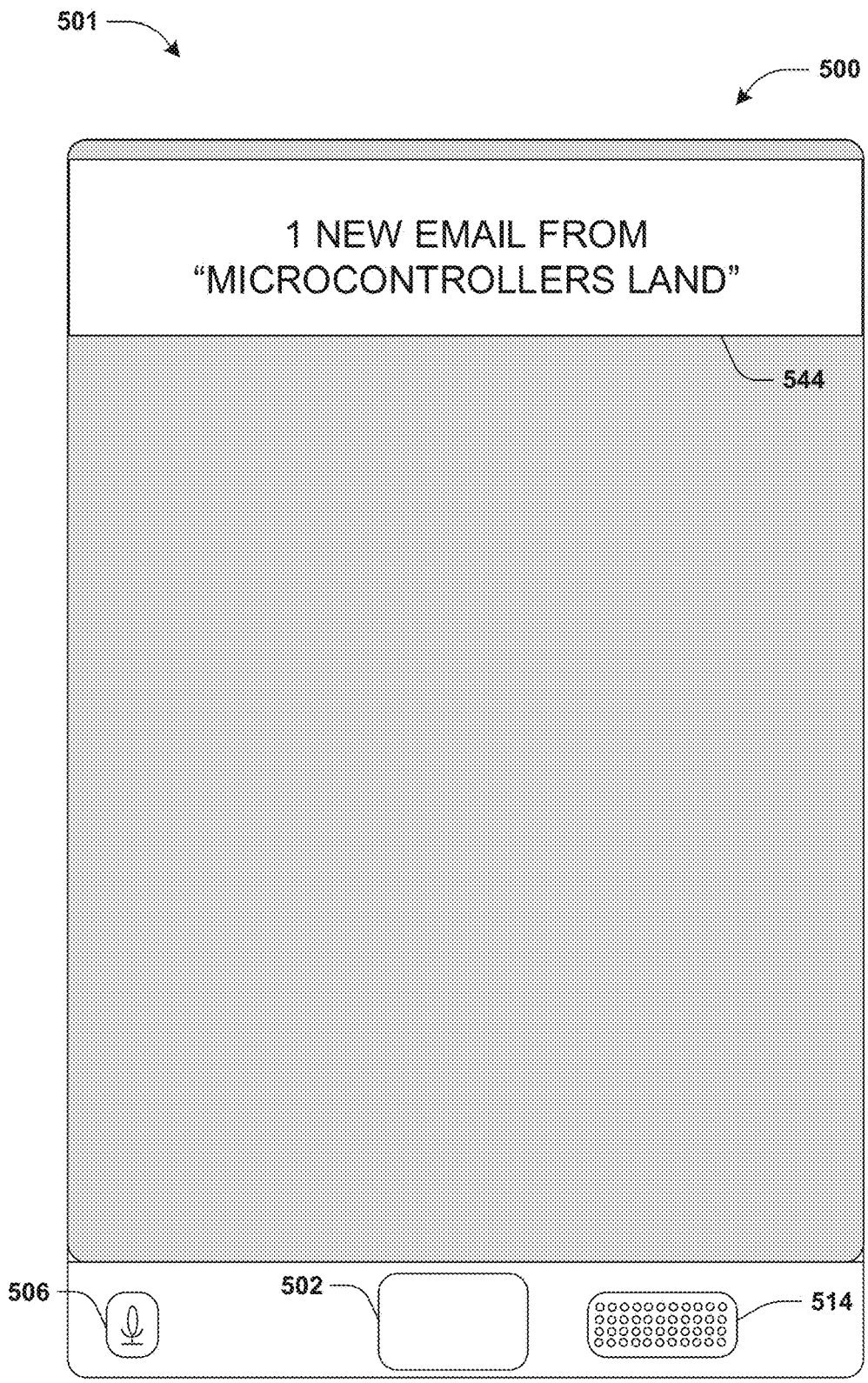
FIG. 5G is a component block diagram illustrating an example system for modifying content interfaces based upon levels of activity, where a graphical user interface of a first client device is controlled to display a second notification.

FIG. 5G illustrates the graphical user interface of the first client device 500 being controlled to display the second notification 544. For example, the second notification 544 may be provided during the one or more times of day (and/or at a beginning of the one or more times of day). For example, the second notification 544 may be transmitted to the first client device 500, the email may be transmitted to the first client device 500 and/or the second notification 544 may be displayed using the first client device 500 during the one or more times of day. In some examples, a selection of the second notification 544 may be received. For example, responsive to the selection of the second notification 544, the first content interface may be displayed.

Figure 5H:
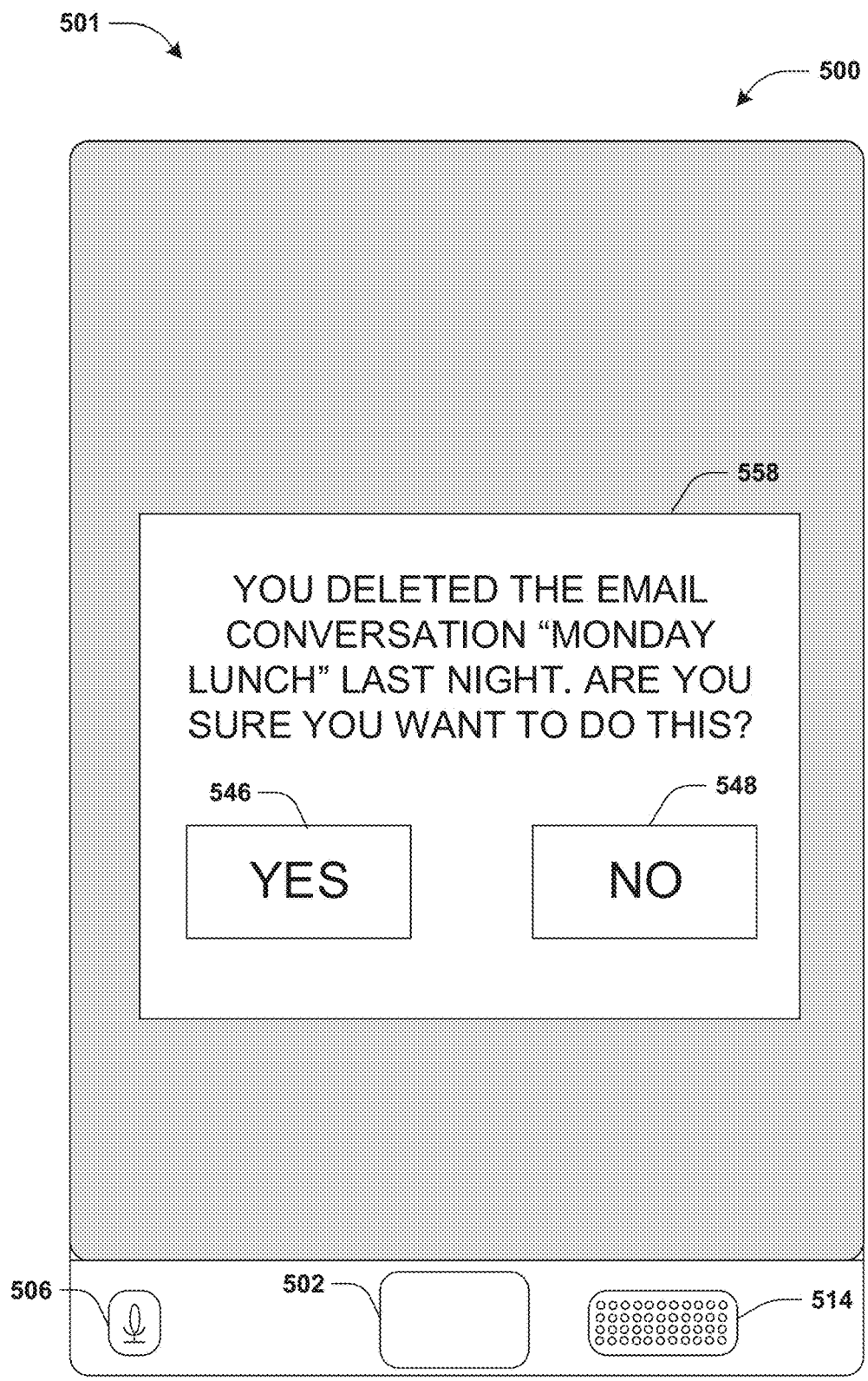
FIG. 5H is a component block diagram illustrating an example system for modifying content interfaces based upon levels of activity, where a graphical user interface of a first client device is controlled to display a third notification.

FIG. 5H illustrates the graphical user interface of the first client device 500 being controlled to display a third notification 558. For example, the third notification 558 may be associated with a second confirmation to delete the first email item 510. For example, the third notification 558 may be displayed during the one or more times of day (e.g., the third notification 558 may be displayed when the first content interface is opened and/or displayed during the one or more first times of day). For example, the third notification 558 may comprise a fourth selectable input 546 corresponding to a second confirmation of the request to delete the first email item 510. Alternatively and/or additionally, the third notification 544 may comprise a fifth selectable input 548 corresponding to not deleting the first email item 510. For example, responsive to a selection of the fourth selectable input 546, the first email item 510 may be deleted.

It may be appreciated that the disclosed subject matter may assist a user (e.g., and/or one or more client devices associated with the user) in interacting with a content interface while the user may be exhausted and/or performing actions using the content interface while the user may be exhausted, such that mistakes, such as incorrectly spelling words, transmitting messages to unintended recipients, deleting content items that the user may not intend to delete, etc., may be prevented.

Alternatively and/or additionally, implementation of at least some of the disclosed subject matter may lead to benefits including more accurate and/or precise transmission of content to the one or more client devices (e.g., as a result of determining that a level of activity associated with an activity session exceeds a second level of activity associated with the user, as a result of determining that a level of exhaustion of the user may exceed a threshold level of exhaustion based upon the level of activity exceeding the second level of activity, as a result of modifying the content interface to a modified version of the content interface associated with an exhaustion management mode, as a result of activating a function configured to analyze a message being composed to determine whether intended recipients of the message are comprised within a recipient list, as a result of providing a notification indicative of one or more intended recipients of the message not being comprised within the recipient list, etc.).

Alternatively and/or additionally, implementation of at least some of the disclosed subject matter may lead to benefits including reducing mistakes made by the user while the user is in an exhausted state (e.g., as a result of determining that the level of exhaustion of the user exceeds the threshold level of exhaustion based upon the level of activity exceeding the second level of activity, as a result of modifying the content interface to the modified version of the content interface associated with the exhaustion management mode, as a result of activating one or more first functions configured to prevent the user from making mistakes, as a result of the one or more first functions comprising a second function configured to received confirmations for requests to perform actions such that in cases where selectable inputs associated with requests to perform actions are accidentally pressed, the user has an opportunity to cancel a request such that an action that is mistakenly requested is not performed, etc.).

Alternatively and/or additionally, implementation of at least some of the disclosed subject matter may lead to benefits including more accurately determining that the user is exhausted (e.g., as a result of generating an activity profile associated with the user based upon activity performed by the user, as a result of taking into account various aspects of the activity session including a measure of writing activity, a measure of selecting activity, a measure of consuming activity, a measure of transmitting activity, biometric data, events, trips and/or travel plans to determine the level of activity of the user during the activity session, as a result of determining that the user is exhausted by taking into account the biometric data, the events, the trips and/or the travel plans, as a result of by comparing the level of activity with the activity profile, etc.).

Alternatively and/or additionally, implementation of at least some of the disclosed subject matter may lead to benefits including the user's experience being improved (e.g., as a result of modifying the content interface to the modified content interface when it is determined that the user may be exhausted which may make it easier for the user to perform tasks without making mistakes, by improving an operating efficiency of the first content interface and/or the user during instances that the user is exhausted, etc.).

In some examples, at least some of the disclosed subject matter may be implemented on a client device, and in some examples, at least some of the disclosed subject matter may be implemented on a server (e.g., hosting a service accessible via a network, such as the Internet).

Figure 6:
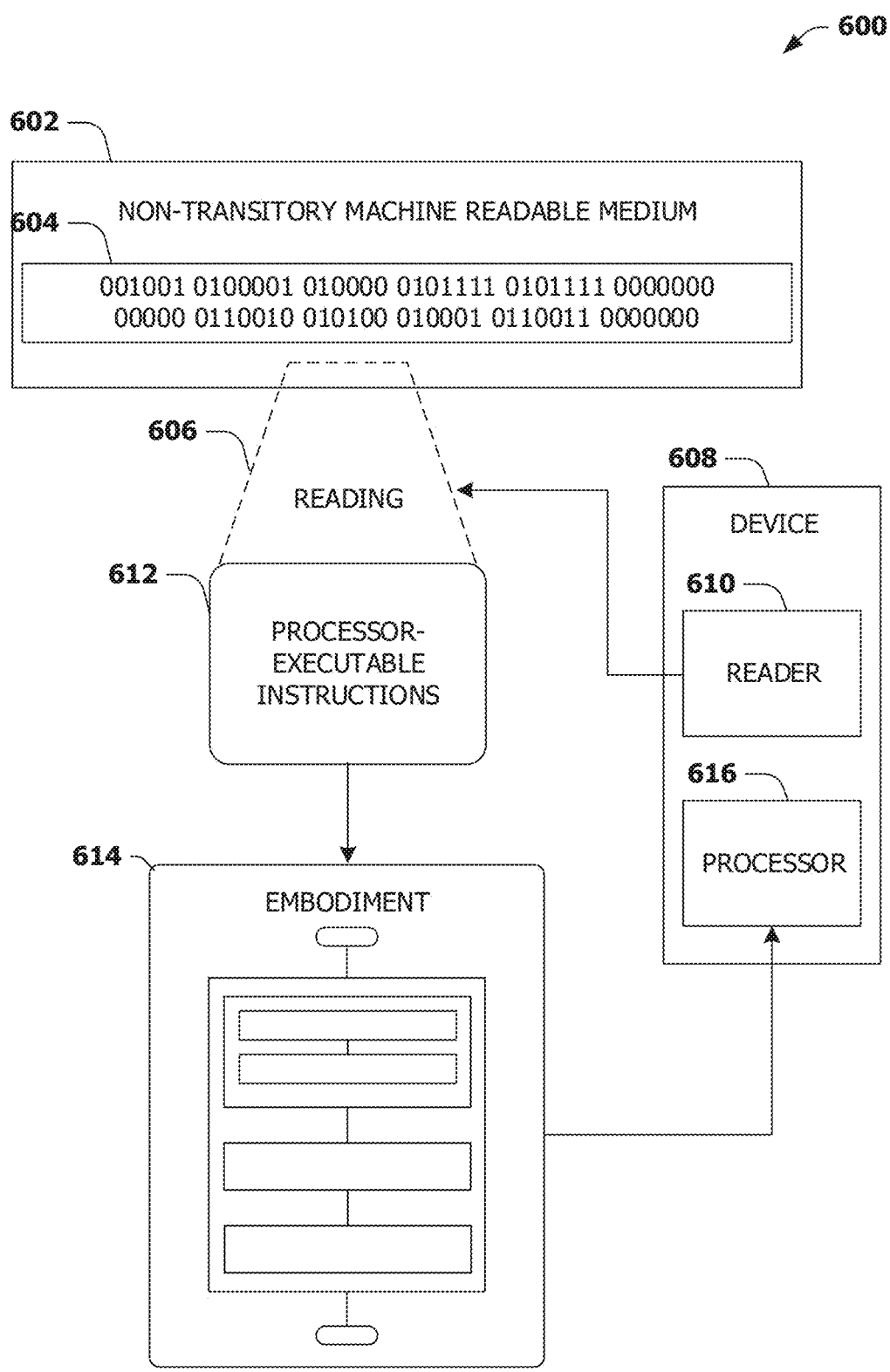
FIG. 6 is an illustration of a scenario featuring an example non-transitory machine readable medium in accordance with one or more of the provisions set forth herein.

FIG. 6 is an illustration of a scenario 600 involving an example non-transitory machine readable medium 602. The non-transitory machine readable medium 602 may comprise processor-executable instructions 612 that when executed by a processor 616 cause performance (e.g., by the processor 616) of at least some of the provisions herein (e.g., embodiment 614). The non-transitory machine readable medium 602 may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disc (CD), digital versatile disc (DVD), or floppy disk). The example non-transitory machine readable medium 602 stores computer-readable data 604 that, when subjected to reading 606 by a reader 610 of a device 608 (e.g., a read head of a hard disk drive, or a read operation invoked on a solid-state storage device), express the processor-executable instructions 612. In some embodiments, the processor-executable instructions 612, when executed, cause performance of operations, such as at least some of the example method 400 of FIG. 4, for example. In some embodiments, the processor-executable instructions 612 are configured to cause implementation of a system, such as at least some of the example system 501 of FIGS. 5A-5H, for example.

3. Usage of Terms

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer and/or machine readable media, which if executed will cause the operations to be performed. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method, comprising:
controlling a graphical user interface, of a device associated with a user account, to display a content interface comprising, at a first location of the content interface, a first selectable input associated with performing a first action in association with a first email represented in the content interface;
detecting first activity performed using the content interface;
generating a first activity profile associated with the user account based upon the first activity, wherein the first activity profile is indicative of a first level of activity associated with the user account;
detecting second activity performed using the content interface;
analyzing the second activity to determine a second level of activity associated with the second activity;
comparing the first level of activity with the second level of activity to determine a difference between the first level of activity and the second level of activity;
determining that the difference between the first level of activity and the second level of activity is greater than a threshold difference;
responsive to determining that the difference between the first level of activity and the second level of activity is greater than the threshold difference:
modifying the content interface, comprising the first selectable input associated with performing the first action in association with the first email represented in the content interface, to a modified version of the content interface, that does not comprise the first selectable input associated with performing the first action in association with the first email represented in the modified version of the content interface, associated with an exhaustion management mode, wherein the first location, in the modified version of the content interface, does not comprise a modified version of the first selectable input associated with performing a second action; and
activating a function for requesting confirmation of one or more requests to delete one or more content items at one or more delayed times after the one or more requests to delete;
responsive to receiving a selection of the first email in the modified version of the content interface, displaying an email interface associated with the first email;
receiving a request to delete the first email via the email interface; and
based upon the function, displaying a notification comprising a plurality of selectable inputs at a delayed time after the request to delete the first email is received, wherein:
a second selectable input of the plurality of selectable inputs corresponds to a confirmation of the request to delete the first email; and
a third selectable input of the plurality of selectable inputs corresponds to a request to not delete the first email.

2. The method of claim 1, wherein:
the first activity profile is indicative of a plurality of levels of activity, comprising the first level of activity; and
each level of activity of the plurality of levels of activity is associated with a set of characteristics of a plurality of sets of characteristics.

3. The method of claim 2, comprising:
responsive to detecting the second activity, determining a first set of characteristics associated with the second activity;
comparing the first set of characteristics with the plurality of sets of characteristics to determine that the first set of characteristics matches a second set of characteristics, of the plurality of sets of characteristics, associated with the first level of activity; and
selecting the first level of activity, from the plurality of levels of activity, for comparison with the second level of activity based upon the determining that the first set of characteristics matches the second set of characteristics, wherein the comparing the first level of activity with the second level of activity is performed responsive to the selecting the first level of activity for comparison with the second level of activity.

4. The method of claim 2, wherein each set of characteristics of the plurality of sets of characteristics is associated with at least one of:
a time of day associated with a level of activity of the plurality of levels of activity;
biometric data associated with the level of activity;
a location associated with the level of activity; or
weather conditions associated with the level of activity.

5. The method of claim 1, comprising:
responsive to the detecting the first activity, at least one of:
monitoring text inputted into one or more text areas of the content interface to generate a measure of writing activity using the content interface;

monitoring selections of selectable inputs of the content interface to generate a measure of selecting activity using the content interface;

determining a duration of time associated with the first activity; or determining a quantity of requests of a plurality of requests, associated with the first activity, received from the device, wherein the generating the first activity profile comprises using at least one of the measure of writing activity, the measure of selecting activity, the duration of time or the quantity of requests to generate the first level of activity associated with the first activity.

6. The method of claim 5, comprising:

responsive to the detecting the second activity, at least one of:

monitoring second text inputted into one or more second text areas of the content interface to generate a second measure of writing activity using the content interface;

monitoring selections of second selectable inputs of the content interface to generate a second measure of selecting activity using the content interface;

determining a second duration of time associated with the second activity; or determining a second quantity of requests of a second plurality of requests, associated with the second activity, received from the device, wherein the second level of activity is determined based upon at least one of the second measure of writing activity, the second measure of selecting activity, the second duration of time or the second quantity of requests.

7. The method of claim 1, wherein the exhaustion management mode is associated with an exhausted state of a user associated with the device.

8. The method of claim 1, wherein the modifying the content interface to the modified version of the content interface comprises activating one or more functions associated with the content interface.

9. The method of claim 8, wherein the one or more functions comprise a spell check function configured to:

analyze text inputted into one or more text areas of the content interface to identify one or more incorrectly spelled words within the text; and at least one of:

automatically modify the one or more incorrectly spelled words to one or more corrected words; or display one or more notifications identifying the one or more incorrectly spelled words.

10. The method of claim 8, wherein the one or more functions comprise a function configured to:

analyze text inputted into a text area associated with a message to identify one or more sets of text associated with a contact of the user account;

determine that the contact is not comprised within a recipient list associated with the message; and display a notification indicative of the contact not being comprised within the recipient list.

11. The method of claim 8, wherein the one or more functions comprise a function configured to:

identify a message received by the user account from a second user account;

analyze the message to determine an importance associated with the message; and responsive to a determination that the importance is less than a threshold importance, delay providing a notification associated with the message.

12. The method of claim 8, wherein the one or more functions comprise a function configured to:

analyze text inputted into a text area associated with a message to identify one or more sets of text indicative of the message being associated with an attachment;

determine that the attachment is not comprised within an attachment list associated with the message; and display a notification indicative of the attachment not being comprised within the attachment list.

13. The method of claim 8, wherein the one or more functions comprise a function configured to:

analyze text inputted into a text area associated with a message to identify one or more sets of text associated with an item of the message;

determine that the item is not comprised within the message; and display a notification indicative of the item not being comprised within the message.

14. The method of claim 1, comprising:

after receiving the request to delete the first email and before the delayed time, displaying a second notification comprising a fourth selectable input corresponding to a second confirmation of the request to delete the first email.

15. The method of claim 1, wherein the modifying the content interface to the modified version of the content interface comprises deactivating one or more functions associated with the content interface.

16. The method of claim 1, wherein the modifying the content interface to the modified version of the content interface comprises restricting access of the device from one or more sets of resources of a plurality of sets of resources associated with the content interface.

17. A computing device comprising:

a processor; and memory comprising processor-executable instructions that when executed by the processor cause performance of operations, the operations comprising:

controlling a graphical user interface of a device to display a content interface comprising (i) a first selectable input associated with performing a first action in association with a first content item represented in the content interface and (ii) a second selectable input associated with performing the first action in association with a second content item represented in the content interface;

detecting first activity performed using the content interface;

generating a first activity profile associated with the device based upon the first activity, wherein the first activity profile is indicative of a first level of activity associated with the device;

detecting second activity performed using the content interface;

analyzing the second activity to determine a second level of activity associated with the second activity;

comparing the first level of activity with the second level of activity to determine a difference between the first level of activity and the second level of activity;

determining that the difference between the first level of activity and the second level of activity is greater than a threshold difference;

responsive to determining that the difference between the first level of activity and the second level of activity is greater than the threshold difference, activating a function for requesting confirmation of one or more requests to perform one or more actions in association with one or more content items at one or more delayed times after the one or more requests to perform the one or more actions;
responsive to receiving a selection of the first content item in the content interface, displaying a content item interface associated with the first content item;
receiving a request to perform the first action in association with the first content item via the content item interface; and
based upon the activation of the function for requesting confirmation of the one or more requests to perform the one or more actions based upon the difference between the first level of activity and the second level of activity, displaying, at a delayed time after the request to perform the first action in association with the first content item is received, a notification comprising a third selectable input corresponding to a confirmation of the request to perform the first action in association with the first content item.

18. The computing device of claim 17, wherein:
the first activity profile is indicative of a plurality of levels of activity, comprising the first level of activity; and
each level of activity of the plurality of levels of activity is associated with a set of characteristics of a plurality of sets of characteristics.

19. The computing device of claim 17, the operations comprising:
after receiving the request to perform the first action in association with the first content item and before the delayed time, displaying a second notification comprising a fourth selectable input corresponding to a second confirmation of the request to perform the first action in association with the first content item.

20. A non-transitory machine readable medium having stored thereon processor-executable instructions that when executed cause performance of operations, the operations comprising:
controlling a graphical user interface of a device to display a content interface comprising a first selectable input associated with performing a first action in association with a first content item represented in the content interface;
detecting first activity performed using the content interface;
analyzing the first activity to determine a first level of activity associated with the first activity;
comparing the first level of activity with a second level of activity to determine a difference between the first level of activity and the second level of activity;
determining that the difference between the first level of activity and the second level of activity is greater than a threshold difference;
responsive to determining that the difference between the first level of activity and the second level of activity is greater than the threshold difference, activating a function for requesting confirmation of one or more requests to perform one or more actions in association with one or more content items at one or more delayed times after the one or more requests to perform the one or more actions;
responsive to receiving a selection of the first content item in the content interface, displaying a content item interface associated with the first content item;
receiving a request to perform the first action in association with the first content item via the content item interface; and
based upon the activation of the function for requesting confirmation of the one or more requests to perform the one or more actions based upon the difference between the first level of activity and the second level of activity, displaying, at a delayed time after the request to perform the first action in association with the first content item is received, a notification comprising a second selectable input corresponding to a confirmation of the request to perform the first action in association with the first content item.

* * * * *